US 8,050,956 B2

(12) United States Patent
Abo-Hasna et al.

(10) Patent No.: US 8,050,956 B2
(45) Date of Patent: Nov. 1, 2011

(54) COMPUTER-READABLE MEDIUM, PROGRAM PRODUCT, AND SYSTEM FOR PROVIDING A SCHEDULE BAR WITH EVENT DATES TO MONITOR PROCUREMENT OF A PRODUCT

(75) Inventors: Ziad Abo-Hasna, St. Ingbert (DE); Chantal Ullrich, Saarbrücken (DE)

(73) Assignee: SAP AG, Walldorf (DE)

( * ) Notice: Subject to any disclaimer, the term of this patent is extended or adjusted under 35 U.S.C. 154(b) by 1023 days.

(21) Appl. No.: 11/074,600

(22) Filed: Mar. 7, 2005

(65) Prior Publication Data

US 2005/0216325 A1 Sep. 29, 2005

Related U.S. Application Data

(60) Provisional application No. 60/551,221, filed on Mar. 8, 2004, provisional application No. 60/563,284, filed on Apr. 16, 2004.

(51) Int. Cl.
*G06F 9/44* (2006.01)
(52) U.S. Cl. ............... 705/7.24; 705/7.12; 705/7.15; 705/7.22
(58) Field of Classification Search ............. 705/7.24, 705/7.22, 7.15, 7.12
See application file for complete search history.

(56) References Cited

U.S. PATENT DOCUMENTS

| | | | |
|---|---|---|---|
| 4,750,119 A | 6/1988 | Cohen et al. | |
| 4,752,877 A | 6/1988 | Roberts et al. | |
| 5,297,250 A | 3/1994 | Leroy et al. | |
| 5,313,392 A | 5/1994 | Temma et al. | |
| 5,315,508 A | 5/1994 | Bain et al. | |
| 5,325,304 A * | 6/1994 | Aoki | 700/100 |
| 5,400,253 A | 3/1995 | O'Connor | |
| 5,500,513 A | 3/1996 | Langhans et al. | |
| 5,615,109 A | 3/1997 | Eder | |
| 5,621,201 A | 4/1997 | Langhans et al. | |
| 5,710,578 A | 1/1998 | Beauregard et al. | |

(Continued)

FOREIGN PATENT DOCUMENTS

JP 2004-030343 A 1/2004

(Continued)

OTHER PUBLICATIONS

Quantity and Due Date Quoting Available to Promise, Chien-Yu Chen, Zhen-Ying Zhao, Michael O. Ball, Information Systems Frontiers, Dec. 2001.*

(Continued)

*Primary Examiner* — Scott L Jarrett
*Assistant Examiner* — Pan Choy
(74) *Attorney, Agent, or Firm* — Foley & Lardner LLP

(57) ABSTRACT

The successful monitoring of procurement processes requires that dates in the supply chain be calculated exactly and tracked accordingly. The central calculation of dates ensures that different applications arrive at the same results, optimizing their accuracy. Monitoring the dates will allow a user to quickly gain an overview of the current procurement situation and react on time to potential delays. Dates from a purchase order are transferred to the event management system and used to calculate base dates. A schedule bar is provided in the event management system, and includes dates received or calculated by the event management system. An activity is triggered based upon the occurrence or nonoccurrence of an event by a purchaser order date or a calculated date.

15 Claims, 17 Drawing Sheets

U.S. PATENT DOCUMENTS

| | | | |
|---|---|---|---|
| 5,758,327 | A | 5/1998 | Gardner et al. |
| H1743 | H | 8/1998 | Graves et al. |
| 5,796,614 | A * | 8/1998 | Yamada ........................ 700/106 |
| 5,832,496 | A | 11/1998 | Anand et al. |
| 5,870,716 | A | 2/1999 | Sugiyama et al. |
| 5,878,400 | A | 3/1999 | Carter, III |
| 5,920,846 | A * | 7/1999 | Storch et al. ........................ 705/7 |
| 5,930,769 | A | 7/1999 | Rose |
| 5,930,771 | A | 7/1999 | Stapp |
| 5,943,652 | A * | 8/1999 | Sisley et al. ........................ 705/9 |
| 5,953,707 | A | 9/1999 | Huang et al. |
| 5,999,914 | A | 12/1999 | Blinn et al. |
| 6,014,648 | A | 1/2000 | Brennan |
| 6,029,139 | A | 2/2000 | Cunningham et al. |
| 6,064,984 | A | 5/2000 | Ferguson et al. |
| 6,115,690 | A | 9/2000 | Wong |
| 6,151,588 | A | 11/2000 | Tozzoli et al. |
| 6,185,550 | B1 | 2/2001 | Snow et al. |
| 6,260,024 | B1 | 7/2001 | Shkedy |
| 6,260,241 | B1 | 7/2001 | Brennan |
| 6,285,916 | B1 | 9/2001 | Kadaba et al. |
| 6,341,351 | B1 | 1/2002 | Muralidhran et al. |
| 6,366,890 | B1 | 4/2002 | Usrey |
| 6,473,794 | B1 | 10/2002 | Guheen et al. |
| 6,484,149 | B1 | 11/2002 | Jammes et al. |
| 6,505,093 | B1 | 1/2003 | Thatcher et al. |
| 6,507,851 | B1 | 1/2003 | Fujiwara et al. |
| 6,647,380 | B1 | 11/2003 | Yotsukura |
| 6,671,676 | B1 | 12/2003 | Shacham |
| 6,701,299 | B2 | 3/2004 | Kraisser et al. |
| 6,721,715 | B2 | 4/2004 | Nemzow |
| 6,725,204 | B1 | 4/2004 | Gusley |
| 6,868,528 | B2 | 3/2005 | Roberts |
| 6,910,017 | B1 | 6/2005 | Woo et al. |
| 6,980,966 | B1 | 12/2005 | Sobrado et al. |
| 7,016,859 | B2 | 3/2006 | Whitesage |
| 7,080,030 | B2 | 7/2006 | Eglen et al. |
| 7,082,408 | B1 | 7/2006 | Baumann et al. |
| 7,082,426 | B2 | 7/2006 | Musgrove et al. |
| 7,092,929 | B1 * | 8/2006 | Dvorak et al. ........................ 705/28 |
| 7,096,189 | B1 | 8/2006 | Srinivasan |
| 7,107,268 | B1 | 9/2006 | Zawadzki et al. |
| 7,117,165 | B1 | 10/2006 | Adams et al. |
| 7,124,098 | B2 | 10/2006 | Hopson et al. |
| 7,124,984 | B2 | 10/2006 | Yokouchi et al. |
| 7,139,731 | B1 | 11/2006 | Alvin |
| 7,188,080 | B1 | 3/2007 | Walker et al. |
| 7,216,086 | B1 | 5/2007 | Grosvenor et al. |
| 7,283,975 | B2 | 10/2007 | Broughton |
| 7,343,315 | B2 | 3/2008 | Wittmer et al. |
| 7,346,656 | B2 | 3/2008 | Worthen |
| 7,499,877 | B2 | 3/2009 | Carr et al. |
| 7,516,083 | B1 | 4/2009 | Dvorak et al. |
| 7,523,048 | B1 | 4/2009 | Dvorak |
| 7,574,383 | B1 | 8/2009 | Parasnis et al. |
| 7,647,250 | B2 | 1/2010 | Abo-Hasna et al. |
| 7,660,742 | B2 | 2/2010 | Biwer et al. |
| 7,693,749 | B2 | 4/2010 | Wittmer et al. |
| 7,742,948 | B2 | 6/2010 | Welter et al. |
| 7,805,335 | B2 | 9/2010 | Wittmer et al. |
| 7,813,949 | B2 | 10/2010 | Grendel et al. |
| 7,831,487 | B2 | 11/2010 | Abo-Hasna et al. |
| 7,853,491 | B2 | 12/2010 | Wittmer et al. |
| 2001/0011295 | A1 | 8/2001 | Kobayashi et al. |
| 2001/0013731 | A1 | 8/2001 | Shinohara et al. |
| 2001/0019332 | A1 | 9/2001 | Fisher |
| 2001/0019778 | A1 | 9/2001 | Gardaz et al. |
| 2001/0032130 | A1 | 10/2001 | Gabos et al. |
| 2001/0034673 | A1 | 10/2001 | Yang et al. |
| 2001/0039517 | A1 | 11/2001 | Kawakatsu |
| 2001/0049634 | A1 | 12/2001 | Stewart |
| 2002/0012390 | A1 | 1/2002 | Kim |
| 2002/0013731 | A1 | 1/2002 | Bright et al. |
| 2002/0019778 | A1 | 2/2002 | Isaacson et al. |
| 2002/0023500 | A1 | 2/2002 | Chikuan et al. |
| 2002/0026368 | A1 | 2/2002 | Carter, III |
| 2002/0048369 | A1 | 4/2002 | Ginter et al. |
| 2002/0059108 | A1 | 5/2002 | Okura et al. |
| 2002/0059122 | A1 | 5/2002 | Inoue et al. |
| 2002/0062314 | A1 | 5/2002 | Hisasue et al. |
| 2002/0072986 | A1 * | 6/2002 | Aram ........................ 705/26 |
| 2002/0073114 | A1 | 6/2002 | Nicastro et al. |
| 2002/0078159 | A1 | 6/2002 | Petrogiannis et al. |
| 2002/0099563 | A1 | 7/2002 | Adendorff et al. |
| 2002/0099579 | A1 | 7/2002 | Stowell et al. |
| 2002/0107713 | A1 | 8/2002 | Hawkins |
| 2002/0111892 | A1 | 8/2002 | Sharp et al. |
| 2002/0116241 | A1 | 8/2002 | Sandhu et al. |
| 2002/0120523 | A1 | 8/2002 | Yang |
| 2002/0120533 | A1 | 8/2002 | Wiesenmaier |
| 2002/0123930 | A1 | 9/2002 | Boyd et al. |
| 2002/0128946 | A1 | 9/2002 | Chehade et al. |
| 2002/0138290 | A1 | 9/2002 | Metcalfe et al. |
| 2002/0138360 | A1 | 9/2002 | Inoue et al. |
| 2002/0143644 | A1 | 10/2002 | Tosun et al. |
| 2002/0143690 | A1 | 10/2002 | Mahajan et al. |
| 2002/0147622 | A1 * | 10/2002 | Drolet et al. ........................ 705/7 |
| 2002/0147668 | A1 | 10/2002 | Smith et al. |
| 2002/0152128 | A1 | 10/2002 | Walch et al. |
| 2002/0156858 | A1 | 10/2002 | Hunter |
| 2002/0165782 | A1 * | 11/2002 | Falkenstein et al. ........................ 705/22 |
| 2002/0184116 | A1 | 12/2002 | Tam et al. |
| 2002/0188499 | A1 * | 12/2002 | Jenkins et al. ........................ 705/10 |
| 2002/0188524 | A1 | 12/2002 | Shimizu |
| 2003/0023500 | A1 | 1/2003 | Boies et al. |
| 2003/0028393 | A1 | 2/2003 | Coulston et al. |
| 2003/0028437 | A1 | 2/2003 | Grant et al. |
| 2003/0033231 | A1 | 2/2003 | Turner et al. |
| 2003/0046120 | A1 | 3/2003 | Hoffman et al. |
| 2003/0046195 | A1 | 3/2003 | Mao |
| 2003/0050852 | A1 | 3/2003 | Liao et al. |
| 2003/0065574 | A1 | 4/2003 | Lawrence |
| 2003/0074269 | A1 | 4/2003 | Viswanath |
| 2003/0083961 | A1 | 5/2003 | Bezos et al. |
| 2003/0120528 | A1 | 6/2003 | Kruk et al. |
| 2003/0126024 | A1 * | 7/2003 | Crampton et al. ........................ 705/22 |
| 2003/0128392 | A1 | 7/2003 | O'Brien et al. |
| 2003/0144916 | A1 * | 7/2003 | Mumm et al. ........................ 705/26 |
| 2003/0149578 | A1 | 8/2003 | Wong |
| 2003/0149631 | A1 | 8/2003 | Crampton et al. |
| 2003/0149674 | A1 | 8/2003 | Good et al. |
| 2003/0158791 | A1 | 8/2003 | Gilberto et al. |
| 2003/0171998 | A1 | 9/2003 | Pujar et al. |
| 2003/0172007 | A1 | 9/2003 | Helmolt et al. |
| 2003/0187767 | A1 | 10/2003 | Crites et al. |
| 2003/0200150 | A1 | 10/2003 | Westcott et al. |
| 2003/0200156 | A1 | 10/2003 | Roseman et al. |
| 2003/0200168 | A1 | 10/2003 | Cullen, III et al. |
| 2003/0208365 | A1 | 11/2003 | Avery et al. |
| 2003/0217024 | A1 | 11/2003 | Kocher |
| 2003/0229502 | A1 | 12/2003 | Woo |
| 2003/0236721 | A1 | 12/2003 | Plumer et al. |
| 2004/0006522 | A1 | 1/2004 | Keane et al. |
| 2004/0010463 | A1 | 1/2004 | Hahn-Carlson et al. |
| 2004/0015367 | A1 | 1/2004 | Nicastro et al. |
| 2004/0019528 | A1 | 1/2004 | Broussard et al. |
| 2004/0098358 | A1 | 5/2004 | Roediger |
| 2004/0122689 | A1 | 6/2004 | Dailey et al. |
| 2004/0158507 | A1 | 8/2004 | Meek, Jr. et al. |
| 2004/0162763 | A1 | 8/2004 | Hoskin et al. |
| 2004/0172321 | A1 | 9/2004 | Vemula et al. |
| 2004/0186763 | A1 | 9/2004 | Smith |
| 2004/0186765 | A1 | 9/2004 | Kataoka |
| 2004/0186783 | A1 | 9/2004 | Knight et al. |
| 2004/0210489 | A1 | 10/2004 | Jackson et al. |
| 2004/0220861 | A1 | 11/2004 | Morciniec et al. |
| 2004/0249722 | A1 * | 12/2004 | Sugamura et al. ........................ 705/26 |
| 2004/0267674 | A1 | 12/2004 | Feng et al. |
| 2005/0015303 | A1 | 1/2005 | Dubin et al. |
| 2005/0055283 | A1 | 3/2005 | Zarovinsky |
| 2005/0060270 | A1 | 3/2005 | Ramakrishnan |
| 2005/0075915 | A1 | 4/2005 | Clarkson |
| 2005/0075941 | A1 | 4/2005 | Jetter et al. |
| 2005/0086122 | A1 | 4/2005 | Cirulli et al. |
| 2005/0086125 | A1 | 4/2005 | Cirulli et al. |
| 2005/0096122 | A1 | 5/2005 | Nireki et al. |
| 2005/0096125 | A1 | 5/2005 | LeMay et al. |

| | | | |
|---|---|---|---|
| 2005/0096963 | A1 | 5/2005 | Myr et al. |
| 2005/0102175 | A1 | 5/2005 | Dudat et al. |
| 2005/0102192 | A1 | 5/2005 | Gerrits et al. |
| 2005/0102227 | A1 | 5/2005 | Solonchev |
| 2005/0131807 | A1 | 6/2005 | Schaefer et al. |
| 2005/0165659 | A1 | 7/2005 | Gruber |
| 2005/0171825 | A1 | 8/2005 | Denton et al. |
| 2005/0197912 | A1 | 9/2005 | Wittmer et al. |
| 2005/0197913 | A1 | 9/2005 | Grendel et al. |
| 2005/0197914 | A1 | 9/2005 | Welter et al. |
| 2005/0197915 | A1 | 9/2005 | Biwer et al. |
| 2005/0197918 | A1 | 9/2005 | Wittmer et al. |
| 2005/0197921 | A1 | 9/2005 | Abo-Hasna et al. |
| 2005/0197949 | A1 | 9/2005 | Welter et al. |
| 2005/0203813 | A1 | 9/2005 | Welter et al. |
| 2005/0216325 | A1 | 9/2005 | Ziad et al. |
| 2005/0216357 | A1 | 9/2005 | Wittmer et al. |
| 2005/0216359 | A1 | 9/2005 | Welter et al. |
| 2005/0216375 | A1 | 9/2005 | Grendel et al. |
| 2005/0235020 | A1 | 10/2005 | Gabelmann et al. |
| 2005/0240488 | A1 | 10/2005 | Grendel et al. |
| 2005/0243792 | A1 | 11/2005 | Simon et al. |
| 2005/0246482 | A1 | 11/2005 | Gabelmann et al. |
| 2005/0251734 | A1 | 11/2005 | Gabelmann et al. |
| 2006/0015417 | A1 | 1/2006 | Wittmer et al. |
| 2006/0020512 | A1 | 1/2006 | Lucas et al. |
| 2006/0036507 | A1 | 2/2006 | Pujar et al. |
| 2006/0074746 | A1 | 4/2006 | Kline et al. |
| 2006/0074747 | A1 | 4/2006 | Kline et al. |
| 2006/0074748 | A1 | 4/2006 | Kline et al. |
| 2006/0074749 | A1 | 4/2006 | Kline et al. |
| 2006/0074751 | A1 | 4/2006 | Kline et al. |
| 2006/0112099 | A1 | 5/2006 | Musgrove et al. |
| 2006/0184401 | A1 | 8/2006 | DelGaudio et al. |
| 2007/0050272 | A1 | 3/2007 | Godlewski et al. |
| 2010/0049582 | A1 | 2/2010 | Abo-Hasna et al. |
| 2010/0100455 | A1 | 4/2010 | Song |

FOREIGN PATENT DOCUMENTS

| | | | |
|---|---|---|---|
| WO | WO 99/45450 | A2 | 9/1999 |
| WO | WO 01/71635 | A2 | 9/2001 |

OTHER PUBLICATIONS

"An integrated model for order release and due-date demand management", by Sameh M. Saad et al., Journal of Manufacturing Technology Management, 2004.*

"APS system integration: More challenges Advanced planned and scheduling", by Camas Yuksel, Materials Management and Distribution, Toronto, Jan. 2001.*

"Quantity and Due Date Quoting Available to Promise", by Chien-Yu Chen et al., Robert H. Smith School of Business, University of Maryland, College Park, MD, USA, Information System Frontiers, 2001.*

Van Der Zee et al., "On-line scheduling of multi-server batch operations.", IIE Transactions, vol. 33, No. 7, Jul. 2001, pp. 569-586, 18 pages.

Notice of Allowance for U.S. Appl. No. 10/903,467, mail date Aug. 11, 2010, 13 pages.

Notice of Allowance for U.S. Appl. No. 10/903,867, mail date May 27, 2010, 6 pages.

Notice of Allowance for U.S. Appl. No. 11/047,368, mail date Feb. 14, 2011, 11 pages.

Notice of Allowance for U.S. Appl. No. 11/072,000, mail date Jul. 9, 2010, 12 pages.

Notice of Allowance for U.S. Appl. No. 11/074,368, mail date Mar. 16, 2011, 6 pages.

Notice of Allowance for U.S. Appl. No. 11/075,392, mail date Jan. 5, 2011, 11 pages.

Notice of Allowance for U.S. Appl. No. 11/075,393, mail date Jun. 10, 2010, 19 pages.

Office Action for U.S. Appl. No. 10/981,384, mail date Jan. 14, 2011, 22 pages.

Office Action for U.S. Appl. No. 11/047,368, mail date Jun. 16, 2010, 12 pages.

Office Action for U.S. Appl. No. 11/047,368, mail date Nov. 24, 2010, 11 pages.

Office Action for U.S. Appl. No. 11/072,000, mail date Jul. 17, 2008, 6 pages.

Office Action for U.S. Appl. No. 11/074,368, mail date Aug. 31, 2010, 12 pages.

Office Action for U.S. Appl. No. 11/075,392, mail date Aug. 4, 2010, 15 pages.

Office Action for U.S. Appl. No. 11/075,393, mail date Nov. 24, 2009, 24 pages.

Office Action for U.S. Appl. No. 12/611,754, mail date Jan. 31, 2011, 15 pages.

Stander, Bella; "The choices for taking inventory—and control: a menu of possibilities is available to stores that want to install—or upgrade—computer inventory control systems", Publishers Weekly, Mar. 20, 1995, pp. 33(3), vol. 242, No. 12, retrieved via Dialog on Dec. 17, 2010, 10 pages.

"New Pegasystems Enterprise Application Provides Central Hub for Proactively Managing Operational Exceptions," Business Wire,(recovered from Dialog database), Feb. 3, 2004, 4 pages.

Bartle et al., "A Review of State Procurement and Contracting," Journal of Public Procurement, 2003, vol. 3, Issue 2, pp. 192-214 (23 pages total).

Chen et al., "Near-Optimal Pricing and Replenishment Strategies for a Retail/Distribution System," Operations Research, Nov./Dec. 2001, vol. 49, No. 6, pp. 839-853 (17 pages total).

Goodwin, "The Open-to-Buy System and Accurate Performance Measurement," International Journal of Retail & Distribution Management, Mar./Apr. 1992, vol. 20, Iss. 2, 7 pages.

Notice of Allowance for U.S. Appl. No. 10/903,867, mail date Feb. 17, 2010, 6 pages.

Notice of Allowance for U.S. Appl. No. 10/914,614, mail date Oct. 3, 2007, 9 pages.

Notice of Allowance for U.S. Appl. No. 10/914,614, mail date Jan. 25, 2008, 7 pages.

Notice of Allowance for U.S. Appl. No. 10/932,913, mail date Nov. 16, 2009, 17 pages.

Notice of Allowance for U.S. Appl. No. 10/932,913, mail date Sep. 30, 2009, 26 pages.

Notice of Allowance for U.S. Appl. No. 10/933,127, mail date Feb. 4, 2010, 11 pages.

Notice of Allowance for U.S. Appl. No. 11/071,982, mail date Aug. 10, 2009, 15 pages.

Notice of Allowance for U.S. Appl. No. 11/075,391, mail date Aug. 31, 2009, 18 pages.

Office Action for U.S. Appl. No. 10/903,902, mail date Aug. 7, 2008, 8 pages.

Office Action for U.S. Appl. No. 10/903,467, mail date Feb. 3, 2010, 16 pages.

Office Action for U.S. Appl. No. 10/903,467, mail date Jan. 26, 2009, 17 pages.

Office Action for U.S. Appl. No. 10/903,467, mail date Jul. 23, 2009, 17 pages.

Office Action for U.S. Appl. No. 10/903,467, mail date Jun. 11, 2008, 15 pages.

Office Action for U.S. Appl. No. 10/903,467, mail date Mar. 27, 2007, 11 pages.

Office Action for U.S. Appl. No. 10/903,867, mail date Aug. 19, 2008, 10 pages.

Office Action for U.S. Appl. No. 10/903,867, mail date Feb. 25, 2008, 9 pages.

Office Action for U.S. Appl. No. 10/903,867, mail date Mar. 16, 2009, 9 pages.

Office Action for U.S. Appl. No. 10/903,867, mail date Oct. 7, 2009, 9 pages.

Office Action for U.S. Appl. No. 10/903,902, mail date Apr. 23, 2008, 9 pages.

Office Action for U.S. Appl. No. 10/903,902, mail date Feb. 12, 2009, 2 pages.

Office Action for U.S. Appl. No. 10/903,902, mail date Mar. 22, 2007, 7 pages.

Office Action for U.S. Appl. No. 10/903,902, mail date Sep. 13, 2007, 8 pages.

Office Action for U.S. Appl. No. 10/915,263, mail date Apr. 12, 2010, 14 pages.

Office Action for U.S. Appl. No. 10/915,263, mail date Apr. 14, 2009, 12 pages.

Office Action for U.S. Appl. No. 10/915,263, mail date Apr. 28, 2008, 16 pages.

Office Action for U.S. Appl. No. 10/915,263, mail date Jul. 23, 2007, 15 pages.
Office Action for U.S. Appl. No. 10/915,263, mail date Sep. 12, 2008, 11 pages.
Office Action for U.S. Appl. No. 10/915,263, mail date Sep. 9, 2009, 13 pages.
Office Action for U.S. Appl. No. 10/915,707, mail date Apr. 13, 2009, 6 pages.
Office Action for U.S. Appl. No. 10/915,707, mail date Apr. 21, 2006, 9 pages.
Office Action for U.S. Appl. No. 10/915,707, mail date Aug. 28, 2006, 13 pages.
Office Action for U.S. Appl. No. 10/915,707, mail date Dec. 8, 2008, 5 pages.
Office Action for U.S. Appl. No. 10/915,707, mail date Mar. 16, 2010, 13 pages.
Office Action for U.S. Appl. No. 10/915,707, mail date Mar. 28, 2007, 13 pages.
Office Action for U.S. Appl. No. 10/915,707, mail date May 1, 2008, 14 pages.
Office Action for U.S. Appl. No. 10/915,707, mail date Sep. 14, 2009, 11 pages.
Office Action for U.S. Appl. No. 10/932,913, mail date Apr. 1, 2009, 15 pages.
Office Action for U.S. Appl. No. 10/932,913, mail date Aug. 27, 2007, 14 pages.
Office Action for U.S. Appl. No. 10/932,913, mail date Jan. 23, 2007, 15 pages.
Office Action for U.S. Appl. No. 10/932,913, mail date Mar. 20, 2008, 14 pages.
Office Action for U.S. Appl. No. 10/932,913, mail date Sep. 17, 2008, 14 pages.
Office Action for U.S. Appl. No. 10/933,127, mail date Aug. 3, 2009, 26 pages.
Office Action for U.S. Appl. No. 10/933,127, mail date Jul. 16, 2008, 10 pages.
Office Action for U.S. Appl. No. 10/933,127, mail date Jul. 3, 2007, 5 pages.
Office Action for U.S. Appl. No. 10/933,127, mail date Nov. 28, 2007, 7 pages.
Office Action for U.S. Appl. No. 10/981,384, mail date Apr. 29, 2009, 10 pages.
Office Action for U.S. Appl. No. 10/981,384, mail date Mar. 14, 2008, 7 pages.
Office Action for U.S. Appl. No. 10/981,384, mail date Nov. 23, 2009, 10 pages.
Office Action for U.S. Appl. No. 10/981,384, mail date Oct. 16, 2008, 7 pages.
Office Action for U.S. Appl. No. 11/047,368, mail date Dec. 20, 2007, 15 pages.
Office Action for U.S. Appl. No. 11/047,368, mail date Jul. 24, 2008, 18 pages.
Office Action for U.S. Appl. No. 11/047,368, mail date Jun. 26, 2007, 14 pages.
Office Action for U.S. Appl. No. 11/047,368, mail date Mar. 4, 2009, 16 pages.
Office Action for U.S. Appl. No. 11/047,368, mail date Nov. 10, 2009, 14 pages.
Office Action for U.S. Appl. No. 11/071,982, mail date Feb. 13, 2009, 18 pages.
Office Action for U.S. Appl. No. 11/071,982, mail date Jan. 25, 2008, 19 pages.
Office Action for U.S. Appl. No. 11/071,982, mail date May 29, 2008, 20 pages.
Office Action for U.S. Appl. No. 11/071,982, mail date Nov. 18, 2008, 7 pages.
Office Action for U.S. Appl. No. 11/072,000 mail date Jul. 17, 2008, 6 pages.
Office Action for U.S. Appl. No. 11/072,000, mail date Dec. 9, 2008, 10 pages.
Office Action for U.S. Appl. No. 11/072,000, mail date Jun. 11, 2009, 13 pages.
Office Action for U.S. Appl. No. 11/072,000, mail date Nov. 12, 2009, 9 pages.
Office Action for U.S. Appl. No. 11/074,368, mail date Apr. 14, 2009, 13 pages.
Office Action for U.S. Appl. No. 11/074,368, mail date Aug. 19, 2009, 12 pages.
Office Action for U.S. Appl. No. 11/074,368, mail date Mar. 26, 2008, 12 pages.
Office Action for U.S. Appl. No. 11/074,368, mail date Mar. 29, 2007, 11 pages.
Office Action for U.S. Appl. No. 11/074,368, mail date Mar. 30, 2010, 13 pages.
Office Action for U.S. Appl. No. 11/074,368, mail date Oct. 6, 2006, 8 pages.
Office Action for U.S. Appl. No. 11/075,391, mail date Apr. 8, 2008, 5 pages.
Office Action for U.S. Appl. No. 11/075,391, mail date Dec. 11, 2008, 9 pages.
Office Action for U.S. Appl. No. 11/075,391, mail date May 22, 2009, 9 pages.
Office Action for U.S. Appl. No. 11/075,392, mail date Apr. 8, 2008, 14 pages.
Office Action for U.S. Appl. No. 11/075,392, mail date Dec. 9, 2009, 13 pages.
Office Action for U.S. Appl. No. 11/075,392, mail date May 12, 2009, 13 pages.
Office Action for U.S. Appl. No. 11/075,392, mail date Nov. 13, 2008, 15 pages.
Office Action for U.S. Appl. No. 11/075,393, mail date Jun. 11, 2009, 26 pages.
Office Action for U.S. Appl. No. 11/075,393, mail date May 28, 2008, 9 pages.
Office Action for U.S. Appl. No. 11/075,393, mailed Nov. 24, 2009, 24 pages.
Staib et al., "Purchasing and Supply Chain Management", Air Force Journal of Logistics, Fall 2002, vol. 26, No. 3, 9 pages.
U.S. Appl. No. 60/374,892, filed Apr. 22, 2002, Krajec.
Abraham et al., "An Implemented System For Improving Promotion Productivity Using Store Scanner Data", Marketing Science, Summer 1993, vol. 12, No. 3, pp. 248-269.
Anon., "(A Lot of) Life After H. Ross: Electronic Data Systems", *Financial World*, vol. 162, No. 22, Nov. 9, 1993 (p. 50(2)).
"Beyond Markdown Management", summer/autumn 03, the 4caster, Issue 4, vol. 2, 4 pages, 4 R Systems, Inc. Summer/Autumn 2003.
Brown, "The Effects of Assortment Composition Flexibility on Operating Efficiency", (Abstract Only), *Dissertation Abstracts Int'l.*, vol. 55/08-A, available at least by 1994, (p. 2458).
"Retailers Manage Markdown Challenges Using i2 Solutions", Jan. 13, 2003, NRF 92nd Annual Convention & Expo, 2 pages.
Author unknown, "Staffware and Biomni Join Forces to Provide End-to-End E-Procurement Solution with Enhanced Workflow Capability: Self-Service Functionality will Enable Thousands of Transactions to be Handled Daily from the Desktop," M2 Presswire, Coventry, Feb. 6, 2001, 1 page.
Jensen et al., "Long-Term Construction Contracts: The Impact of Tamra '88 on Revenue Recognition", *Journal of Construction Education*, Spring 1997, vol. 2, No. 1, pp. 37-53.
Kelkar et al., Price Modeling in Standards for Electronic Product Catalogs Based on XML, 2002, pp. 366-375.
Melcher, "Local tech firm creates retail markdown tool", Mar. 24, 2000, Cincinnati Business Courier, 3 pages.
Profitlogic, available at http://webarchive.org/web/2002060311838/, available at least by Apr. 15, 2005, 22 pages.
Srinivasan et al., Concepts and strategy guidelines for designing value enhancing sales promotions, Journal of Product and Brand Management, vol. 7, No. 5, 1998, pp. 410-420.
Subrahmanyan et al., "Developing optimal pricing and inventory policies for retailers who face uncertain demand", Journal of Retailing, vol. 72, No. 1, Spring, 1996, 15 pages.
Wilson, "Changing the Process of Production", *Industrial Management*, vol. 37, No. 1, Jan./Feb. 1995 (pp. 1-2).

\* cited by examiner

COMPUTER-READABLE MEDIUM, PROGRAM PRODUCT, AND SYSTEM FOR PROVIDING A SCHEDULE BAR WITH EVENT DATES TO MONITOR PROCUREMENT OF A PRODUCT

CROSS-REFERENCE TO RELATED PATENT APPLICATIONS

This application claims the benefit of U.S. Provisional Application No. 60/551,221, filed Mar. 8, 2004 and entitled "Inventory Management," and U.S. Provisional Application No. 60/563,284, filed Apr. 16, 2004 and entitled "Inventory Management," both of which are hereby incorporated by reference.

BACKGROUND OF THE INVENTION

In general, business models can involve buying merchandise and services for one price and selling it for another. In the process, sellers can incur spectacular costs marketing to prospective and existing users, leasing stores, paying employees, buying and maintaining information technology, transporting, and, most importantly, buying and managing the transfer of the merchandise itself.

These various costs require planning to be, at one level, a strategic activity. Executives set business objectives and merchandise planners derive strategies to meet them: back to basics to reduce the style count, extended assortments with additional colors and styles, or new lines of business such as health & beauty. On another level, planning is tactical and operational. The plan influences how many styles and colors a merchant will carry. It influences how distributions are planned for stores. It influences when markdowns are expected to be taken for each style and color. It also influences which stores should carry each style. Current business systems suffer from a limited ability for interaction between these two levels of planning.

In many businesses, such as retail stores, the procurement of goods is one of the key items to be planned. One of the key challenges faced by procurement monitoring is to keep track of processes, warehouse stocks and different events in the supply chain—from a purchase order with external suppliers to goods receipt in the warehouse—and react to potential problems. Optimizing the smooth flow of the procurement process will increase an enterprise's efficiency and competitiveness and determine its success.

The successful monitoring of procurement processes requires that dates in the supply chain be calculated exactly and tracked accordingly. The central calculation of dates ensures that different applications arrive at the same results, optimizing their accuracy. Monitoring the dates will allow a user to quickly gain an overview of the current procurement situation and react on time to potential delays.

A computerized method and system are needed for use with the key procurement processes in the fashion industry, from the point of view of procurement monitoring, and fashion scheduling.

SUMMARY OF THE INVENTION

The present invention relates to systems and methods for organizing a store. According to a first embodiment of the present invention, a method is provided for monitoring procurement data of an article via an event management system in a computerized business system. A purchase order is generated having dates. The purchase order dates are transferred to the event management system. The base dates are calculated from at least the purchase order dates. A schedule bar is provided in the event management system, the schedule bar including dates received or calculated by the event management system. An activity is triggered based upon the occurrence or nonoccurrence of an event by a purchaser order date or a calculated date. The procurement monitoring data is displayed in a procurement monitoring dialog display.

According to another embodiment, a computerized event management system for monitoring and managing procurement dates within a business enterprise. The system includes purchase order dates and purchase order information received from a purchase order. Base dates are calculated from at least the purchase order dates and transit times calculated from purchase order information applied to a transportation time schedule. Non-base dates are calculated from at least base dates or purchase order dates. A schedule bar including dates received or calculated by the event management system is provided. A triggered activity based upon the occurrence or nonoccurrence of an event by a purchaser order date or a calculated date occurs wherein the reminder includes a cancellation threat which indicates to the event management system that no further are to be generated.

According to yet another embodiment, program product for monitoring and managing procurement dates within a business enterprise, the program product comprises machine-readable program code. A purchase order is generated having dates. The purchase order dates are transferred to the event management system. The base dates are calculated from at least the purchase order dates. A schedule bar is provided in the event management system, the schedule bar including dates received or calculated by the event management system. An activity is triggered based upon the occurrence or nonoccurrence of an event by a purchaser order date or a calculated date. displaying the procurement monitoring data in a procurement monitoring dialog display.

Other features and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

DETAILED DESCRIPTION OF THE PREFERRED EMBODIMENTS

The present invention relates to computerized systems and methods for use with key procurement processes. In accordance with the principles of the present invention, system and methods for monitoring procurement processes are provided. The successful monitoring of procurement processes requires that dates in the supply chain be calculated exactly and tracked accordingly. The central calculation of dates ensures that different applications arrive at the same results, optimizing their accuracy. Monitoring the dates allows a user to quickly gain an overview of the current procurement situation and react on time to potential delays. The present invention calculates certain dates in the procurement process, with the dates and corresponding events operatively linked.

While the present invention may be utilized in various business settings and industries, the non-limiting examples that follow generally are from the point of view of procurement monitoring in the retail sales industry such as fashion or stackable merchandise. In one exemplary embodiment, the present invention comprises a computerized business system which includes an event management system.

Figure 1:
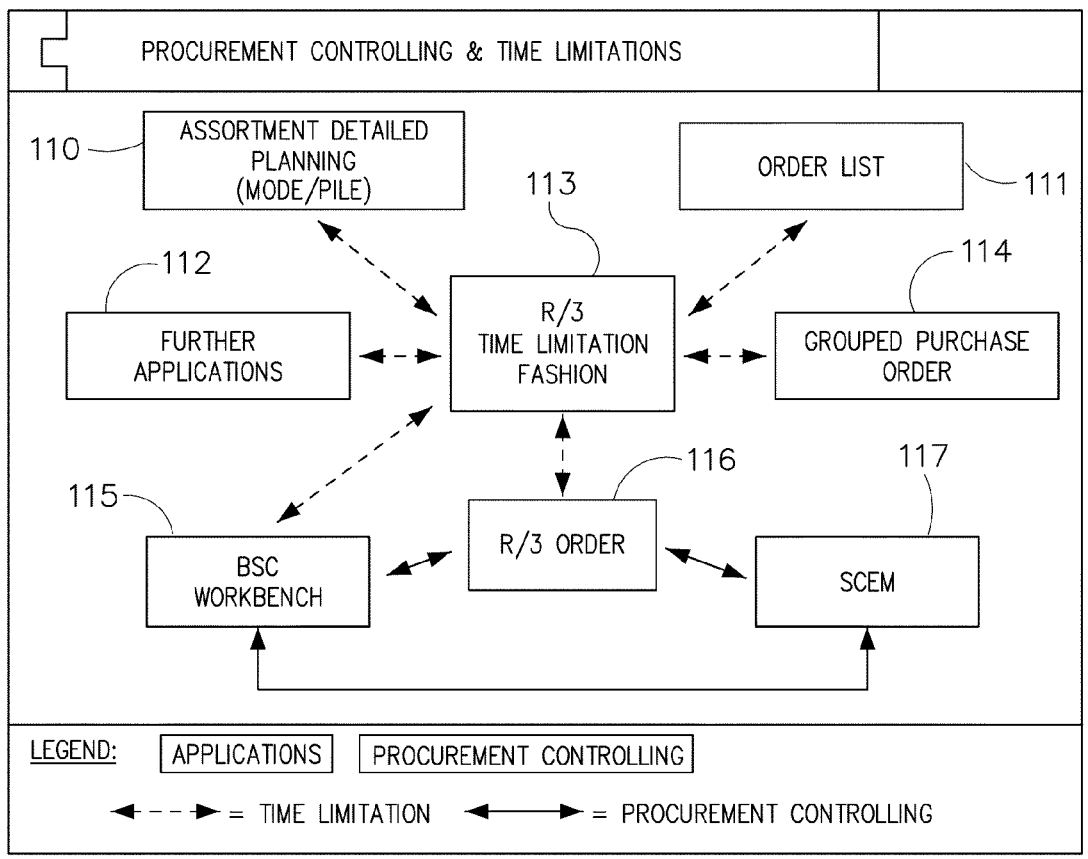
FIG. 1 is an overview of procurement monitoring and scheduling.

Procurement monitoring starts when a purchase order is created and is used to track dates and events in the supply chain, from the moment a purchase order is created with external suppliers to the stage at which the goods are presented in the store. FIG. 1 illustrates an exemplary overview of one embodiment of a procurement monitoring system 101. As can be seen various systems and items communicate with the procurement monitoring system 113, purchase order 111, group order 114, assortment planning 110, procurement, 116, SCEM 117, the procurement workbench 115, and other systems 112 all communicate with the procurement monitoring system 113. Monitoring aims to identify any changes to scheduling and the impacts these could have on storing the goods in the distribution center or on the punctual presentation of the goods in the store. It also serves to introduce measures to ensure that planned activities are carried out on schedule.

Procurement monitoring itself starts with purchase order generation. The purchase order dates are transferred to event management system for deadline monitoring, together with the parameters required for calculation. The event management system includes, in one embodiment, a schedule bar displayed on a graphical user interface. The schedule bar includes dates received and/or calculated by the event management system. In one exemplary embodiment, the schedule bar in the event management system is created as follows:

If, when the purchase order is being created, the dates of all items correspond, the data bar can be generated at the header level. This is expected to be the case for purchase order grouping with the delivery date as the split criterion. If date changes are then made in individual items, or new items with deviant dates are inserted, the schedule bars can be created retroactively for these deviant items at the item or schedule line level in the events management system.

If a user already has different dates at the item level when an order is being generated, or if a schedule bar at the header level is not required, the schedule bar can be generated directly at the item or schedule line level.

In one embodiment, customizable settings are provided by which a user may use the event management system in conjunction with the business system to determine which procedure is used to generate the schedule bar in event management system. The schedule bar is a graphical representation of the schedule for the relevant procurement item or items.

In an exemplary embodiment, a procurement monitoring dialog or "procurement workbench" is provided to allow the user a graphical interface to evaluate the results of monitoring procurement.

One aspect of the present invention relates to the calculation of base dates. Base dates are the dates that are always relevant for procurement monitoring, and must therefore always be determined. For example, the following table lists, for one embodiment, the base dates in their chronological order (except for the handover date):

TABLE 1

Base Dates for Procurement Controlling

| Base Date | Description |
| --- | --- |
| Latest purchase order date | Date by which a purchase order must be triggered, to ensure that goods are received or presented punctually as planned. |
| Material staging date | Date from which the goods can be delivered by the supplier. |
| Issue date | Date on which the goods leave the location at which main transportation starts. (Main transportation = transportation that takes longest) |
| Arrival date | Date on which the goods reach the location at which main transportation ends. (Main transportation = transportation that takes longest) |
| Delivery date (also referred to below as goods receipt distribution center (DC GR)) | Date on which the goods arrive at the goods recipient (from the supplier's viewpoint) - usually the distribution center. |
| Handover date | Date on which the risk for the goods switches over from the supplier to the purchaser. Up to the handover date, the supplier bears the transportation risk. As of the handover date, the risk is transferred over to the purchaser. The handover date is not an additional date, and corresponds to one of the following, as agreed between the purchaser and the supplier: Material staging date Issue date Arrival date Delivery date |
| DC availability date | Date from which the goods are either stored in the distribution center, or is available to the stores for further transportation. If the goods received are to be processed, this is carried out on the availability date. |
| DC goods issue date | Date on which the goods must leave the distribution center, to arrive punctually in the store for the delivery date. For a store group, this is always the earliest goods issue date for the store that will receive a delivery last. |

TABLE 1-continued

Base Dates for Procurement Controlling

| Base Date | Description |
|---|---|
| Store goods receipt date | Date on which the goods arrive in the store. For a store group, this is always the earliest goods receipt date for the store that will receive a delivery last. |
| Store presenation date | Date from which the goods will be presented on the store's selling are. For a store group, this is always the latest presentation date for the store that will receive a delivery last. |

Figure 2:
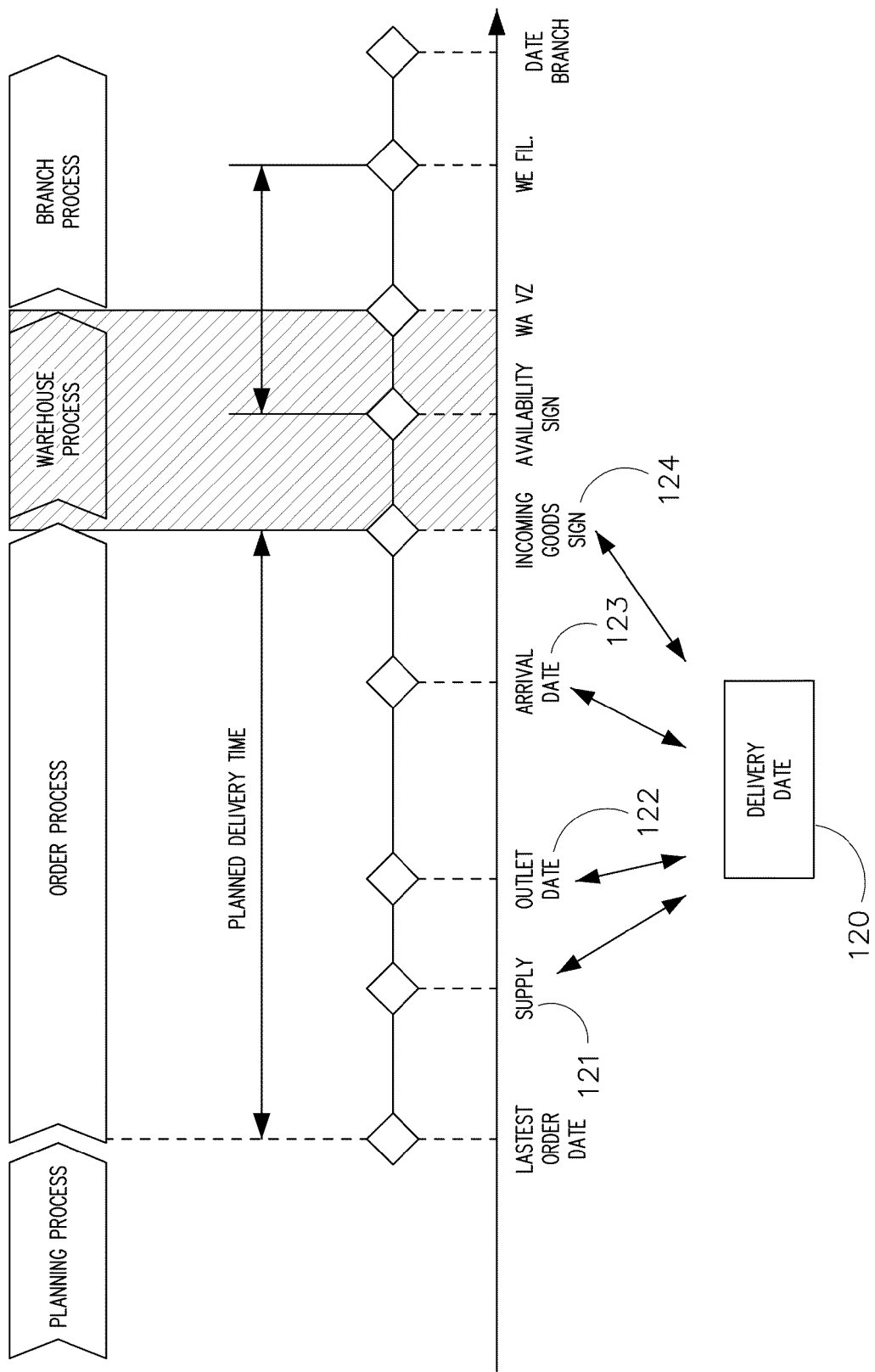
FIG. 2 illustrates a depiction of the base dates, as defined in Table 1, along the process chain, wherein the handover date corresponds to one of the following base dates: Material staging date, issue date, arrival date or delivery date.

It is important to note that all of the base dates are operative dates, that is, the base dates represent an operative event, i.e., a milestone, in physical material movements. FIG. 2 illustrates the base dates in relation to the process chain itself, the handover date 120 is depicted as being one of material staging date 121, issue date 122, arrival date 123, or delivery date 124. The base dates maybe linked to each other, wherein if one date is changed all of the subsequent dates are changed. In the alternative, only some of the base dates may be linked so that a change in one date changes some, but not all, of the subsequent base dates. In one embodiment, schedule deviations for a milestone may cause subsequent (chronologically) base dates to shift. The impact of a schedule deviation can be decided on automatically or manually. In a hypothetical example, a delay in the issue date for the goods has a direct impact on the arrival date. Thus, in the worst case scenario, the presentation date in the store cannot be adhered to as the goods may not have sufficient time to be physically moved from their place of origin to the recipient store.

The procurement process starts when the purchase order dates are transferred to the purchase order, and ends when the goods are presented in the store. The upstream planning process is also depicted in FIG. 2, as fashion scheduling can also be integrated into the planning applications.

As can be seen from FIG. 2, it is not sufficient to use just the planned delivery time to calculate the individual base dates. Preferably, other parameters are also incorporated into scheduling. In particular, the time taken to transport the goods from a particular point of departure to a specific location using a particular means of transport (for example, truck or ship), is taken into account. The point of departure and point of arrival are entered, for example based on the location code for trade and transport. In an exemplary embodiment, in addition to the parameters required to calculate dates, the following calendars are also taken into account:

The vendor calendar is also to be taken into account when calculating the order and material staging date. It must contain information on the workdays, public holidays, and company vacation days.

The logistics calendar, which is relevant for transportation routings, must be taken into account when calculating the issue date, arrival date, delivery date, and the store GR date.

The distribution center logistics calendar must be taken into account when calculating the delivery date (distribution center goods received), the distribution center availability date, and the distribution center goods issue date.

The store logistics calendar must be taken into account when calculating the store delivery date (store goods received) and the store presentation date.

The order cycle of the ordering retail site (usually the distribution center) is used to determine the days on which the goods are ordered with the supplier. It must therefore be taken into account when calculating the latest purchase order date.

The delivery cycle specifies the days on which the goods are delivered in the recipient retail site. It must therefore be taken into account when calculating the distribution center goods receipt date and the store goods receipt date.

As mentioned above, in accordance with the principles of the present invention, the base dates are used for the calculation of addition dates, in one embodiment subsequent base dates and or non-base dates. In an exemplary embodiment, flexible date calculation is provided for, i.e., it is possible to use all of the dates specified in Table 1 as the start date for calculating other base dates. If several dates are specified, the calculation is carried out up to the next specified date. This can then be used as the new start date for further calculations, i.e., some dates may be dynamically linked with other dates used for further date calculation. Thus, in one embodiment, if a user changes a calculated date, the recalculation of either all or only specific dates must be triggered if necessary. In an exemplary embodiment utilizing a computerized business system, this is be controlled by the application that calls scheduling, for example the event management system.

The selection of any start date allows the different applications to call date calculation in line with their specific needs. For example, in fashion operational assortment planning and control, backward scheduling can be used to calculate the latest purchase order date based on the store presentation date, whereas the delivery date can be calculated from the latest purchase order date in the ad-hoc purchase order using forward scheduling. In one embodiment, date history is used to display target dates at any time.

Activities are triggered in the procurement monitoring workbench or directly in the event management system, depending on whether they are to be carried out automatically or manually. A user can trigger the activities automatically by specifying them in the event management system. Alternatively, a user can use the procurement monitoring workbench to trigger them manually or semi-automatically.

In addition to the base dates described in above, there will be additional dates that can be defined and enhanced at any stage, such as by customizable settings in the business system. In one embodiment, the following additional dates are be available:

TABLE 2

Additional dates

| Additional Dates | Description |
|---|---|
| Order confirmation date | Order confirmation is part of a supply contract. Here, the supplier confirms the receipt of the purchase order, and the quantities and articles that will be delivered. |
| Quotation sample date | Date by which the supplier will provide a sample quotation. A schedule deviation may result in an order being cancelled, but never results in delivery being delayed. |
| Sample photo date | A supplier must provide a sample photograph by this date. A schedule deviation may result in an order being cancelled, but never results in delivery being delayed. |
| Sample size | A supplier must provide a size sample by this date. |
| Sample date | Date by which the supplier must provide a sample of the goods. A schedule deviation may result in an order being cancelled, but never results in delivery being delayed. |
| Labeling date | Date by which the supplier must have ordered labels. |

These additional dates are not operative dates, i.e., if these dates are not adhered to, there is no impact on subsequent base dates. While the additional dates may be linked to the base dates, the relation is unilateral; no dependencies exist between the individual additional dates or between additional and base dates. Additional dates can be mapped either by user-specific manual entries or application-specific calculation algorithms.

During order generation, all dates that are to be monitored for a purchase order are transferred to the event management system. These dates are also referred to as target dates or planned/anticipated dates. In an exemplary embodiment, the parameters determined for calculation are also transferred to the event management system, in addition to the purchase order dates. This is particularly important if data retention for the dates and parameters is only carried out in events management system once the order has been generated.

In one embodiment, the event management system and business system interface also control which dates are actually monitored. In the case of foreign purchase orders, for example, this allows a user to monitor the issue and arrival date. Both of these dates may be irrelevant for domestic purchase orders, on the other hand. In another embodiment, the date monitoring is only to be carried out as of the handover date. This would mean that all dates before the handover date would be irrelevant.

The events management system monitors whether dates are adhered to, with the exception of the latest purchase order date, which, in an exemplary embodiment, is monitored by an order manager. The new procurement monitoring workbench, from which a user can trigger follow-on activities, is to be used to evaluate monitoring results. Alternatively, a user also is able to trigger activities—such as sending e-mails if deadlines are not adhered to—in the events management system.

The procurement monitoring workbench preferably is adapted to carry out various tasks. It allows a user to carry out on time measures that are necessary if dates are not adhered to, to avoid possible delayed deliveries or coordinate the impacts of a delayed delivery on subsequent processes (for example, the delivery of replacement goods on the planned presentation date), referred to as reactive approach. A user can also use the procurement workbench at any stage to find out about ongoing procurement processes in the supply chain, which is described by the base dates schedule bar. This allows a user to intervene in the procurement process, for example by cancelling purchase orders, if economic circumstances change—particularly in cases where the financial situation is unclear, referred to as the active approach. This active approach is particularly necessary in the area of fashion, as orders sometimes have a lead time of between six months and a year. The selected purchase orders are grouped according to milestones. For example, in a hypothetical situation, due to poor turnover, a party has instructed that purchase orders be cancelled. In this hypothetical scenario, the procurement monitoring workbench allows a user to display all open purchase orders and their corresponding delivery status.

In one embodiment, the following functions, described in more detail below, are to be included in the worklist, to support the reactive approach for the individual items (order header or order item/schedule line):

Reminder

Date shift

Cancellation

Sending of unformatted e-mails

In another embodiment, the following functions, described in more detail below, are included to support the active approach:

Date shift

Cancellation

Sending of unformatted e-mails

Graphic formatting of purchase orders grouped according to milestones, such as based on quantity and/or value. In one embodiment, only dates up to the distribution center delivery date (or store delivery date for direct store orders or third-party business) are taken into account. Customer-specific enhancements (for example, the stock view milestone) also allow the flexibility of graphic display.

The visualization of purchase orders grouped according to milestones provides a user with a quick overview of the flow of goods. If, for example, a user has to cancel purchase orders due to the financial situation, a user is able to use the graphic display to focus on the purchase orders whose cancellation have the greatest impact.

As mentioned above, a reminder function is provided in one embodiment for the reactive approach. The handover date (for example, the delivery date) is preferably monitored as the reminder procedure date, though it must be appreciated that any of the various dates could be used as the basis for a reminder. The events management system is used to control whether a purchase order is proposed for a reminder. The event management system may also be used to determine whether the reminder is created automatically by triggering the corresponding business system transaction or manually by the procurement monitoring workbench. If a purchase order is proposed for manual reminder creation in the procurement monitoring workbench, a user has the option of not creating a reminder, but instead moving the date.

When the reminder procedure is triggered, the system creates a reminder and moves the handover date. The new handover date and the subsequent dates are calculated automatically by scheduling based on the date the reminder was created. However, a user can set the handover date, thus driving the preceding base dates. For example, in one embodiment, a user is able to manually change the date automatically calculated by the system. The subsequent base dates are calculated again based on the new handover date.

When a user creates a reminder, the user has the option of setting a final deadline in the reminder. This is referred to as a "cancellation threat". The procedure for further handling orders after the cancellation threat is defined in the event management system and can be defined in accordance with the relevant commercial laws. For example, a user may want the system to automatically cancel the purchase order if a date is not adhered to, which in turn triggers the deletion of the event handler. The number of reminders created is recorded and updated in the event management system. Preferably, it is possible to flexibly design the sending of reminders, for example by fax or e-mail. A reminder level represents a processing step within the framework of the legal reminder procedure. Depending on the reminder level, the purchaser is entitled to notify the supplier about the delay in delivery, or withdraw from the purchasing agreement.

TABLE 3

Example of a Reminder Procedure

| Reminder Levels and Triggering Criteria (Event Management) | Activities | | A | M |
|---|---|---|---|---|
| 1st reminder<br>Delivery date has passed<br>Purchase order does not have any fixed business<br>No reminder level | Calculate new delivery date<br>Create reminder letter<br>Set reminder level 1 in the purchase order<br>Change delivery date<br>Send reminder | | X | X |
| 2nd reminder<br>Delivery date has passed<br>Fixed business or first reminder level already exists | No cancellation threat<br>Calculate new delivery date<br>Create reminder letter<br>Set reminder level 2 in purchase order<br>Change delivery date<br>Send reminder | With cancellation threat<br>Calculate new delivery date<br>Create reminder letter with cancellation threat<br>Set reminder level 2 in the purchase order with cancellation indicator<br>Change delivery date<br>Send reminder | X | X |
| Other reminders<br>Delivery date has passed<br>2nd reminder level already exists | A user can choose from two options:<br>a) Other date shifts<br>b) Date shift with cancellation threat | Create cancellation notification<br>Cancel the purchase order<br>Send cancellation notification | X | X |

A = Automatic control,
M = Manual control

As mentioned earlier, in an exemplary embodiment date shifting is also provided for. If delays occur, the corresponding date can be moved either automatically or manually, based on the actual date. Scheduling recalculate the subsequent dates based on this date shift. It must also be possible to manually change the date calculated by the system.

The number of date shifts is recorded and updated in the event management system. Changes to dates result in the scheduling bar being updated in the event management system, so that the monitoring of new dates in the event management system are triggered again. The event management system is used to control whether a purchase order is proposed for a date shift. The event management system is also used to determine whether the date shift is carried out automatically by triggering the corresponding business system transaction or manually by the procurement monitoring workbench. If a purchase order is proposed for a manual date shift in the procurement monitoring workbench, a user has the option of not carrying out a date shift or to create a reminder in addition to the date shift.

As previously mentioned, in one embodiment the system of the present invention includes functionality for cancelling purchase orders/items/schedule lines. In the procurement monitoring workbench, a user is able to manually cancel purchase orders at the header, item, or schedule line level. The event management system is used to control whether a purchase order is proposed for cancellation. A user is also able to define a condition in the event management system to determine whether a purchase order can be cancelled automatically by calling the corresponding function in the business system, or manually using the procurement monitoring workbench. For example, the business system can include provisions in accordance with the Uniform Commercial Code. If a purchase order was proposed for manual cancellation in the procurement monitoring workbench, a user can cancel the purchase order manually. A user must be able to issue a reminder or carry out a date shift instead of carrying out a cancellation.

Cancellation of partial/remaining quantities by under delivery (i.e., purchase order completion), as discussed above, is available in some embodiments. Cancellation or the insistence that remaining quantities be delivered are carried out independently of scheduling and the reminder procedure. The corresponding under deliveries are displayed in procurement monitoring at the purchase order item level. It must be possible to either cancel the remaining quantities, or create a new delivery date (date shift as discussed above) to indicate that the remaining quantity be delivered. Choosing a date shift, to indicate that the delivery should go ahead, must trigger the process for monitoring the delivery of the remaining quantity.

TABLE 4

| Remaining Quantity Criteria that Trigger Actions Event Management | Activities | | A | M |
|---|---|---|---|---|
| The goods receipt | Determine quantity variance | | X | X |
| that arrived on the goods receipt target date was not complete (delivery completed indicator not selected). | Proceed with delivery<br>Specify new delivery date<br>Create noticifation for the supplier<br>Send notification to the supplier<br>Create new schedule line with new delivery date in the purchase order | Cancellation<br>Create a cancellation notification for the remaining quantities<br>Send notification to the supplier<br>Set delivery completed indicator in the purchase order item/schedule line | | |

A = Automatic control,
M = Manual control

It is possible to transfer the parameters required for date calculation either from the master data of the business system or using a fashion scheduling input template. This applies in particular to the assortment planning processes as some of the articles are either not listed here or possibly do not exist at all. If one or more of the parameters used for the calculation change, then scheduling is triggered again by the corresponding application, as otherwise the data may be inconsistent. For example, in a hypothetical scenario, if the shipping instructions (for example from ship freight to air freight) change, the transportation times taken into account in scheduling also change. The scheduling is rerun to ensure consistency of dates within the business system and with the reality of the real world.

In one embodiment, a user may monitor different dates from different types of purchase orders. For example, a user may wish to monitor issue and arrival dates for foreign originating orders, but not domestic orders.

Figure 10:
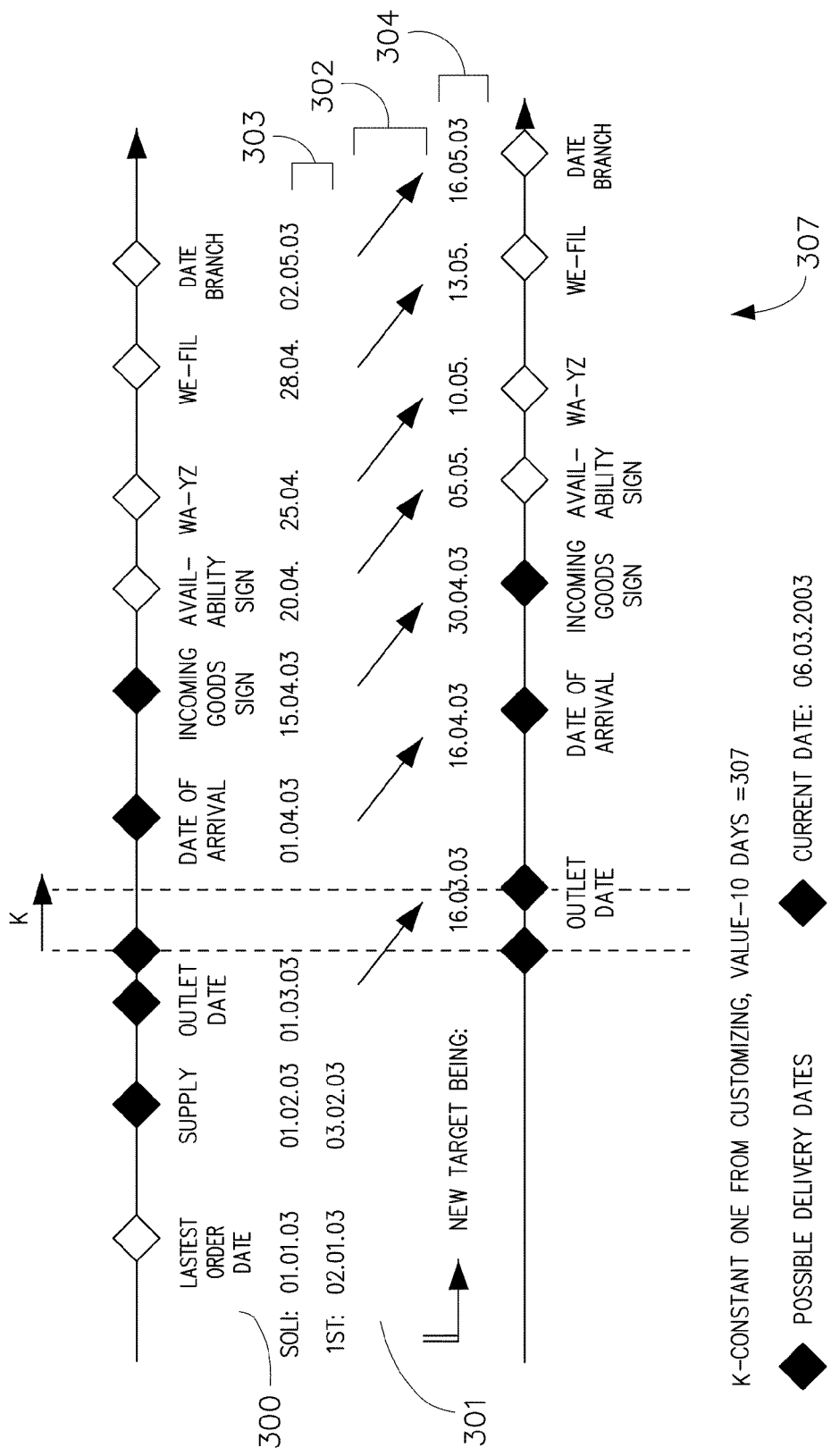
FIG. 10 illustrates a date shift.

A user can record the number of days by which a date is to be moved, based on the current date, in the customizing settings for procurement monitoring. In this context, the constant is independent of the base dates. FIG. 10 depicts the process 307 for shifting dates. In the FIG. 10, the issue date 300 has not been adhered to, and a date shift is required. Based on the current date 300, in the first step, the new issue date 301 is calculated by adding a constant stored in the procurement monitoring customizing settings, taking account of the calendar relevant for the issue date. The system does not check the current date 300 against a calendar. In the second step, the moved issue date 301 is used as the start date for recalculating the subsequent base dates. The original base dates 303 are shifted a determined amount of time 302 (15 days in FIG. 10) to determine the new base dates 304. The parameters determined for the original date calculation are used here. The parameters are not determined again.

Each delivery date change that is triggered from procurement monitoring and which causes a date shift in the next open to buy budget, is not open-to-buy checked within the framework of the set tolerances. For example a date shift which moves a delivery date from one month to another does not trigger an open to buy check for the second month, as the order was already cleared for the first month. To implement the requirements from limit planning/open-to-buy, as described, the open to buy relevant purchasing documents and purchasing document items for obsolete open to buy budgets are placed in the procurement monitoring workbench.

Amongst other things, parameters from article and vendor master data are required to calculate dates. However, the article master data is only partially created when planning is carried out for fashion items. If, in particular, the logistics view does not exist yet for an article and retail site, the required parameters are determined from the logistics view for the reference article of the material group and reference site. This requires, however, that the logistics views of the material group reference article are maintained for the reference sites.

Various systems and operations within the business system require various dates (both additional and base). In exemplary embodiments having an ad-hoc purchase order, the following prerequisites apply to the calculation of the base dates:

- If the start date specified for date calculation is the same as the purchase order date or latest purchase order date, the system checks this start date against the vendor calendar and the goods recipient's order cycle, and it is possible to place this exact date in scheduling.
- If the start date specified for date calculation is the same as the delivery date, the system checks this start date against the factory calendar and the recipient retail site's delivery cycle, and it is possible to place this exact date in scheduling.
- If an open-to-buy check is not successful and the purchase order date is delayed as a result, the corresponding application (purchase order list or grouped worklist) uses the available parameters to carry out rescheduling. The system does not trigger a redetermination of the parameters.
- It is possible to call a date maintenance dialog at the purchase order level. The dates and parameters maintained here apply for all purchase order items, with the exception of the items/schedule lines that are maintained differently.
- It is possible to also call the date maintenance dialog at the purchase order item and schedule line level.
- The country specified in the delivery address corresponds with the country of the main transportation or post-transportation phase. If the delivery address is changed, this results in a direct change in the transportation chain.
- A fixed business indicator is used at the purchase order header level.
- Cancellation threat: This field is used in the purchase order at the header, item, and schedule line levels.
- Integration of the schedule bar archiving and deletion functions into the purchase order archiving and deletion functions. Furthermore, it is possible to archive the purchase order if the entire purchase order is no longer being monitored (the corresponding schedule bars are already deactivated).

The business system uses certain dates for procurement. For example, in one exemplary embodiment, it is possible to calculate the following dates for procurement:
Purchase order date
Delivery date
Handover date dispatch location
Handover date point of arrival
Sample size date
Sample photo or specimen date Within the framework of procurement monitoring, a user is able to display all OTB-relevant purchasing documents or purchasing document items for obsolete OTB budgets, to make corresponding changes in documents.
Move the delivery date to a current or future delivery period
Delete the order or item The following items are determined from the store delivery date: distribution center delivery date and the latest possible purchase order date. In this context, the same logic should be used as in purchase order generation.

Dates that are calculated in operative assortment planning and control and passed on to follow-on processes are not overwritten by a rescheduling in these processes. Once date monitoring has been transferred to purchase order generation, a user is able to trigger rescheduling if necessary, or modify the dates manually.

Figure 3:
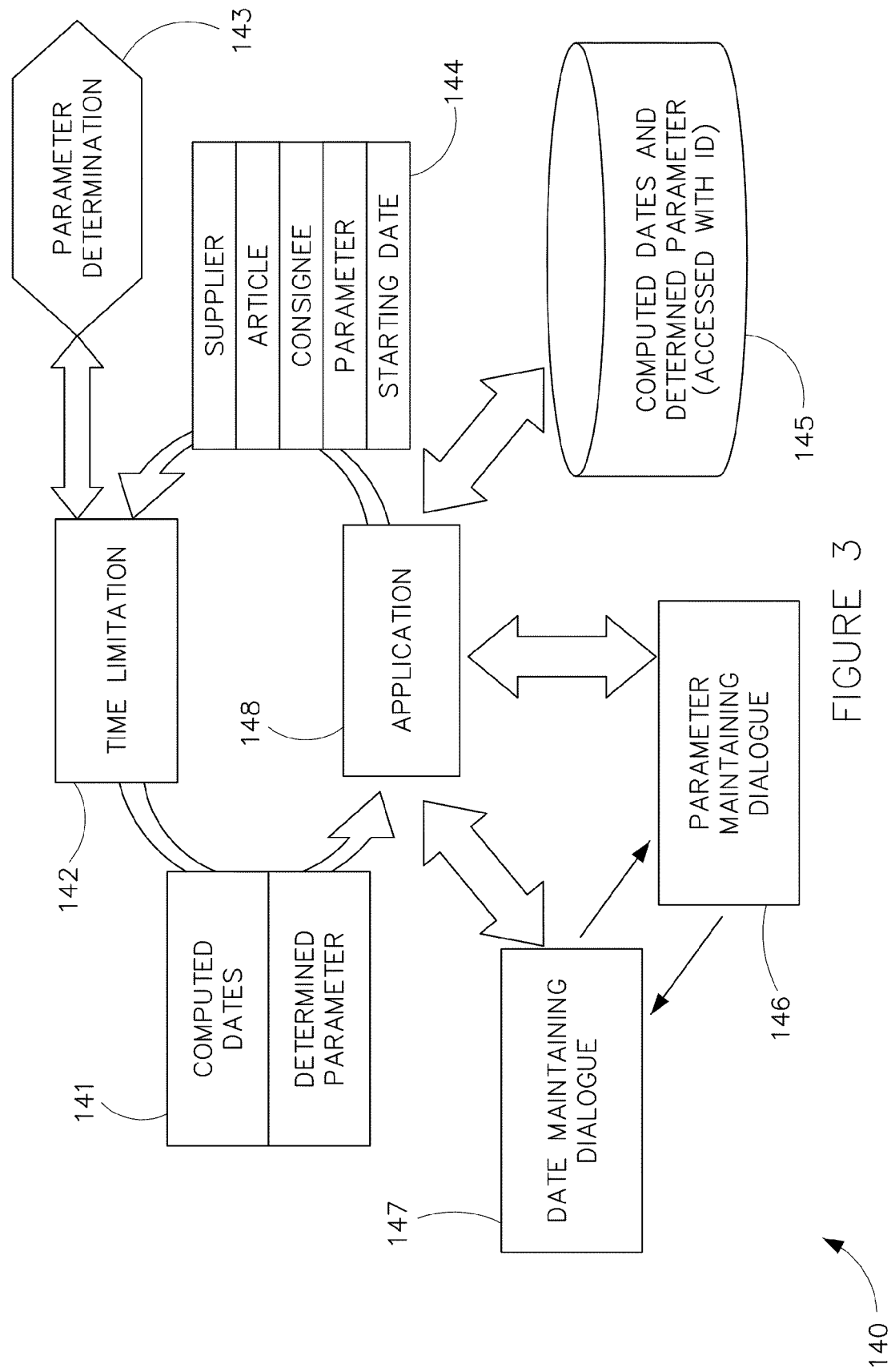
FIG. 3 is a diagram reflecting an overview of the scheduling process.

The event management system may include, in one embodiment, additional systems specific to business structure or industry, such as for example the retail fashion industry. FIG. 3 depicts a scheduling process overview for fashion scheduling 140. The scheduling process 148 is in communication with various aspects of the overall system. The parameter information 143 feeds into scheduling 142 (and receives information back). Scheduling 142 provides information 141, such as calculated dates and acquired parameters, to a central processing step 148 of monitoring. The date dialog 147, maintenance dialog 146, and calculated dates and acquired parameters ID 145. The step 148 provides information 144 back to scheduling. Fashion scheduling aims to calculate the base dates along the procurement process chain for fashion stores. Purchase orders for external suppliers are taken into account in this context. In one embodiment, a fashion scheduling system is utilized and transfers the data required to calculate dates as previously discussed.

Scheduling determines the missing parameters, calculates the base dates and returns these dates to the application. The event management system provides the parameters and dates determined to the user for manual revision, both in the date maintenance dialog and the parameter maintenance dialog. When the business system saves the data, the dates and parameters used to calculate the dates are stored on the database together with an identification number. An application can pass on this identification number to the next application, for example, from operational assortment planning and control for fashion, to the purchase order via the purchase order list, and rescheduling is not absolutely necessary.

Figure 4:
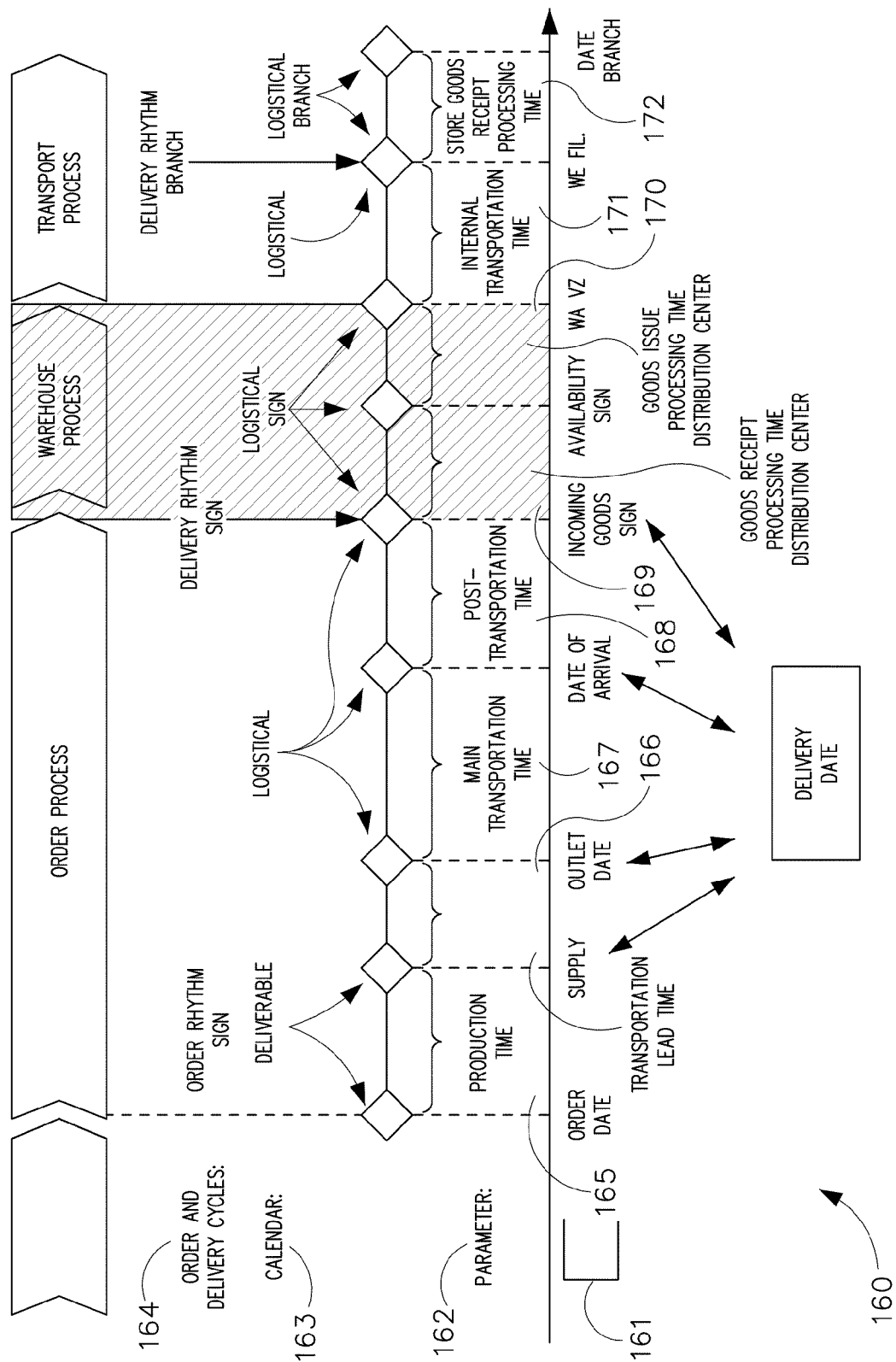
FIG. 4 is a chronological timeline of base dates, calendars, and order and delivery cycles.

In a preferred embodiment, the base dates are structured chronologically along the process chain, with the exception of the handover date. FIG. 4 depicts the process chain 160. The base dates 161 are shown together with the parameters 162, calendars 163, and order and delivery cycles 164 required for their calculation. FIG. 4 also illustrates the relation of the various temporal parameters to the overall process chain 160 the parameters production time (PRDZT) 165, transportation lead time (TRVZT) 166, main transportation time (TRAZT) 167, post-transportation time (TRNZT) 168, goods receipt processing time distribution center (WEBAZ VZ) 169, goods issue processing time DC (WABAZ) 170, internal transportation time (TRAZT int.) 171 and store goods receipt processing time (WEBAZ Fil.) 172.

The parameters describe the intervals between two base dates, i.e. the time it takes for the article to move from the milestone represented by a first base date to a milestone represented by a second base date. The production time 165 corresponds to the time that elapses between the latest purchase order date and the material staging date. It describes the number of working days that the vendor requires to produce the goods including labeling and so on, but not including transportation to the point of departure of the main transport. The production time can be stored in the purchasing data of the article master, and as a default value for articles in the purchasing organization data in the vendor master.

The transportation lead-time 166 is made up of two parameters. The first specifies the number of days required to transport the goods from the vendor to the point of departure of the main transport. In other words, it describes the amount of time required for transportation alone. The second parameter records the time required for stock turnover.

The main transportation time 167 specifies the time taken for the main transportation in days. It is the longest of all the transportation times, and depends on the means of transport, the point of departure, and the point of arrival. The system contains a new table for transportation times, which contain the main transportation times 167, based on the specified parameters 162.

Like the transportation lead time 166, the post-transportation time 168 is made of two parameters. The first specifies the number of days required to transport the goods from the point of departure of the main transport to the goods recipient. The second contains, amongst other things, the time required for import processing (for example, the payment of customs duties) and stock turnover times.

The distribution center/store goods receipt processing time 169 specifies the number of working days required to check and store the article after the goods have been received. A user can maintain the goods receipt processing time 169 in the logistics data for the article master. The goods issue processing time 169 describes the number of working days required between the availability of the goods and withdrawal of the material from the warehouse and transportation. It includes the pick/pack, packaging, and loading times, for example. This parameter can be maintained in the logistics data for the article master.

The internal transportation time 171 specifies the number of days required for transportation from the distribution center to the store. Like the transportation lead time 166, the post-transportation time 168, and the main transportation time 167, a user records this parameter in the new table for transportation times.

As shown in FIG. 4, the business system uses the following calendars 163, order and delivery cycles 164 to calculate the base dates 161. The vendor calendar is taken into account when calculating the order and material staging date. It contains information on the vendor's workdays, public holidays, and company vacation days. The vendor calendar is stored in the vendor master data.

The logistics calendar, which is relevant for transportation routings, is taken into account when calculating the issue, arrival, and delivery dates. The logistics calendar is maintained when the transportation routings are being defined.

The distribution center logistics calendar from the retail site master data is taken into account when calculating the delivery date (distribution center goods received, the delivery center availability date, and the distribution center goods issue date).

The store logistics calendar—which is also stores in the retail site master data—is taken into account when calculating the delivery date (store goods received) and the store presentation date.

The order cycle of the ordering retail site (usually the distribution center) is used to determine the days on which the goods are ordered with the supplier. It is taken into account when calculating the latest purchase order date.

The order cycle is calculated based on the planning cycle, which is stored in the logistics view of the article master or in the vendor master at the purchasing organization/retail site (as a default value for the article master), plus the purchasing department processing time.

The delivery cycle specifies the days on which the goods are delivered in the recipient retail site. It is taken into account when calculating the distribution center goods receipt date and the store goods receipt date. The delivery cycle is maintained in the DC or store logistics view of the article master or in the vendor master at the purchasing organization/retail site level (also as a default value for the article master).

The sums of the following parameters correspond to the planned delivery time for the external procurement process:

Production time+transportation lead time+main transport time+post-transportation time The sums of the following parameters correspond to the planned delivery time for the internal procurement process:

Goods receipt processing time+transportation time for the internal process

The transportation times, based on the point of departure and point of arrival, and the means of transport used (for example, truck or ship) are taken into account in scheduling. The transportation times are entered in a new maintenance dialog and stored in the new table of transportation times. In this context, the reference to the means of transport is made using the definition of modes of transport and shipping types (fashion). Modes of transport include, for example, road, rail, ship, inland waterway and air. In the table of transportation times, the times are maintained based on the mode of transport.

Figure 5:
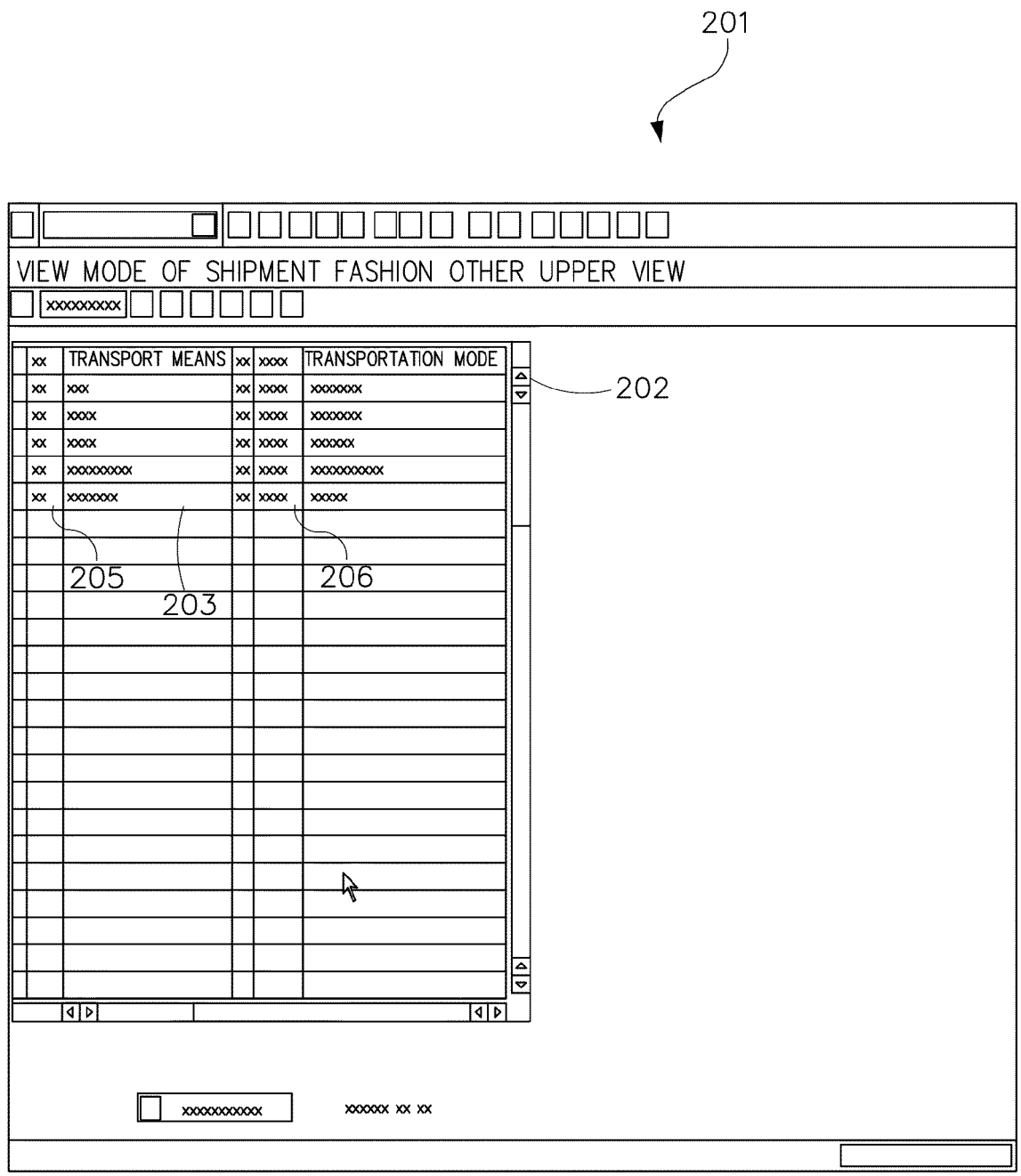
FIG. 5 is a graphical user interface for displaying shipping information.

The "Shipping type Fashion" represents the link between means of transport and modes of transport. It describes the means of transport and the mode of transport (as described in Table 3) used to transport the goods. A user maintains the shipping types via a customizing function. FIG. 5 depicts the potential entry screen 201 for the shipping types, and outlines some examples. The entry screen lists the transportation mode used 202 (i.e. ground, air, sea, etc.), as well as the associated specific means of transport 203 (such as specific airlines or rail services). Identification numbers 205 can be assigned to the transport means 203. Similarly, a unique identifier 204 can be used for the transportation mode 202.

The definition of modes of transport outlined above can be used to describe the table of transportation times in greater detail. The following table depicts the table's structure:

TABLE 5

Example of Possible Entries in the Table of Transportation Times

| Outlet Country | Place of Departure | Arrival Country | Arrival Sort | Additional Transportation Lead Time | Additional Transportation Hunting Time | Transportation by Traffic-Slow-Acting | | | |
|---|---|---|---|---|---|---|---|---|---|
| | | | | | | Land | Sea | Air | Inland Waterway |
| BE | / | BE | / | / | / | 1 | 1 | 1 | 1 |
| BE | ANR | DE | ESS | 2 | 4 | 1 | 2 | 1 | 5 |
| CN | / | CN | / | 2 | 3 | 5 | 5 | 1 | 5 |
| CN | SHA | BE | ANR | 2 | 5 | 100 | 90 | 2 | / |
| DE | / | DE | / | / | / | 1 | 5 | 1 | 5 |
| DE | ESS | DE | MUC | / | / | 2 | 5 | 1 | 8 |
| DE | MUC | DE | ESS | / | / | 2 | 5 | 1 | 8 |
| TR | / | TR | / | / | / | 2 | 6 | 1 | 5 |
| TR | IZM | TR | / | / | / | 2 | 5 | 1 | 4 |
| TR | / | DE | / | 1 | 2 | 8 | 12 | 2 | / |
| TR | / | DE | ESS | 1 | 2 | 7 | 15 | 1 | / |

Table 5 — Example of Possible Entries in the Table of Transportion Times

For example, in one embodiment, when a user enters transportation times, a user specifies the following:
- A five-digit location code for trade and transport that identifies the point of departure and the arrival location.
- The transportation times in entire days, based on the following modes of transport: Land; Sea; Air; Inland waterway.
- A user can also maintain transportation lead and post-transportation times. These values refer to times that arise as a result of stock turnover or customs duties, and are taken into account in addition to the transportation time itself. A user maintains these values as entire days as well.
- The transportation lead time is only taken into account for transportation preliminary phases that take account of the post-transportation time for post-transportation phases in date calculation.
- As soon as a user records an entry in the table of transportation times for a country, a user must also make a general entry for the corresponding country. Only the countries of departure and arrival, and no actual details of the location, are provided for this general entry. If, during subsequent accesses of the table of transportation times, no entry is found for the points of departure or arrival, this general country entry is used to calculate the transportation times.

Transportation of the goods often occurs by numerous means. Thus, the business system includes a transportation chain. In foreign trade in particular, the transportation chain forms the transportation stage from the supplier to the goods recipient. This is characterized by the fact that the goods are transported by the supplier to the goods recipient using several means of transport.

In one embodiment, the transportation chain is subdivided into additional segments based on the type of transport and length of time. In one exemplary embodiment the transportation chain includes the transportation lead, main, and post-transportation phases. In this context, the transportation lead phase describes all transportation from the production location or supplier's warehouse to the point of departure of the main transport, including stock turnover to the main means of transport. The post-transportation phase describes all transport from the point of arrival of the main transport to the goods recipient, including all import processing activities and stock turnover. In a preferred embodiment, the main transport is the transportation with the longest transportation time.

To simplify the scheduling process, a transportation chain with one main transport and up to one transportation lead and one post-transportation phase is defined for fashion scheduling. A transportation phase is broken down into transportation stages with the following characteristics:
- The country of departure;
- The point of departure;
- The country of arrival;
- The point of arrival;
- The means of transport (for example, ship, truck, plane, train, etc.);
- The logistics calendar for transportation times To access the table of transportation times, at least the country of departure, the country of arrival, and the means of transport are used. These details are therefore obligatory when defining a transportation chain for the main transport. As soon as a transportation lead or post-transportation phase is defined, the country-specific details and the means of transport are also obligatory here. The location-specific details, which are optional, are entered in line with the location code for trade and transport. In one embodiment, a category is provided for subdivisions within countries such as "state of departure" and "state of arrival".

In one embodiment, the country of arrival of the transportation lead phase is the same as the country of departure for the main transport. Accordingly, the country of arrival of the main transport is the same as the country of departure for the post-transportation phase. The following combinations are possible for the location details:
- Point of arrival not specified in the transportation lead phase, but point of departure specified in the main transport
- Point of arrival specified in the transportation lead phase, but point of departure not specified in the main transport
- The location-specific details correspond if a user specify the point of arrival in the transportation lead phase and also specify the point of departure in the main transport
- Point of arrival not specified in the main transport, but point of departure specified in the main transport
- Point of arrival not specified in the main transport, but point of departure specified in the main transport
- The location-specific details correspond if a user specify the point of arrival in the main transport and also specify the point of departure in the post-transportation phase.

These conditions apply if the transportation lead and post-transportation phases are specified in the transportation chain.

In an exemplary embodiment, the calendar to takes account of legal regulations and the different valuations of transport days for different means of transport. For example, a ship on the open sea is active seven days of the week twenty four hours a day, whereas trucks are restricted to reflect maximum time drivers are allowed to drive without rest.

Figure 6:
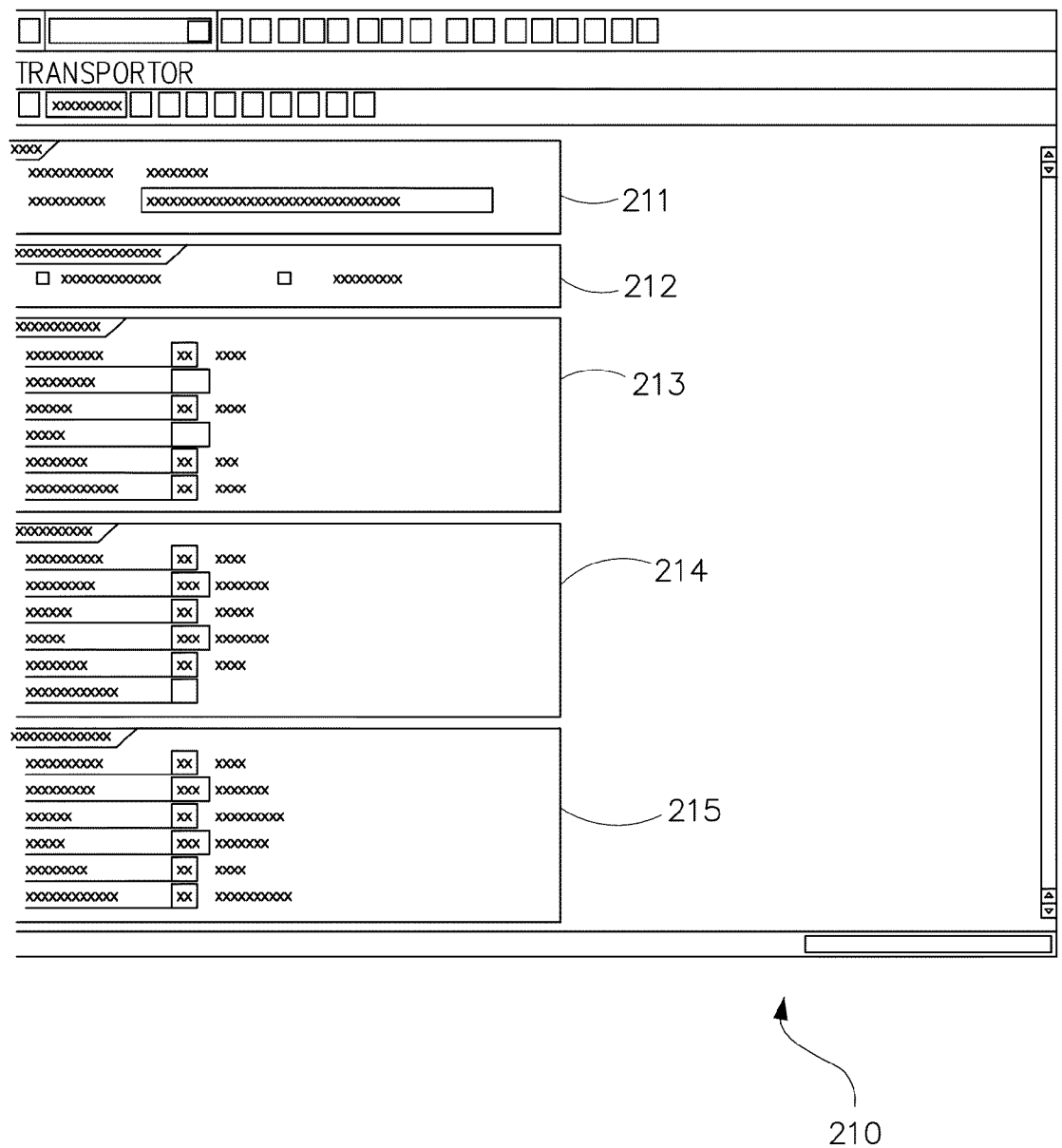
FIG. 6 is a graphical user interface screen for creating a transportation chain.

In one embodiment, a user is able to define a transportation chain and its stages in a new maintenance dialog box (see FIG. 6). The maintenance dialog 210 is broken down as follows. In the first group box 211, a user defines the key for the transportation chain and a self-explanatory name. In the second group box 212, a user can select whether the user want to define a transportation lead and post-transportation phase for the transportation phase, in addition to the main transport. If transportation lead phase is activated in the second group box 212, a user can define this phase in the third group box 213. Here, a user enters data in the country of departure, country of arrival, and means of transport fields. The conditions described above apply to the country and location-specific information. If, on the other hand, a user does not activate the transportation lead phase in the second group box 212, this group box is left blank and is hidden. In the fourth group box 214, a user defines the main transport as described above. The same rules apply to the post-transportation phase in the fifth box 215 as to the transportation lead phase. In other words, a user can enter the data required for the post-transportation phase if this phase is activated in the second group box 212.

If a transportation chain has been defined, it is possible to use it as a default value for scheduling in a supplier's master data, at the following levels:
Purchasing organization
Purchasing organization and retail site
Purchasing organization and vendor sub range
Purchasing organization, retail site, and vendor sub range In one embodiment, the business system is able to map domestic business transportation. Depending on specific requirements, the transportation lead time and/or post-transportation time are not taken into account in the definition of a transportation chain for domestic transport (e.g., where the point to point transit is always one day). These "national" transportation chains are therefore suitable for the internal transportation processes of distribution centers to stores. The transportation chain is assigned to a distribution center in line with the external process using the distribution center vendor master data at the data levels specified above.

Figure 7:
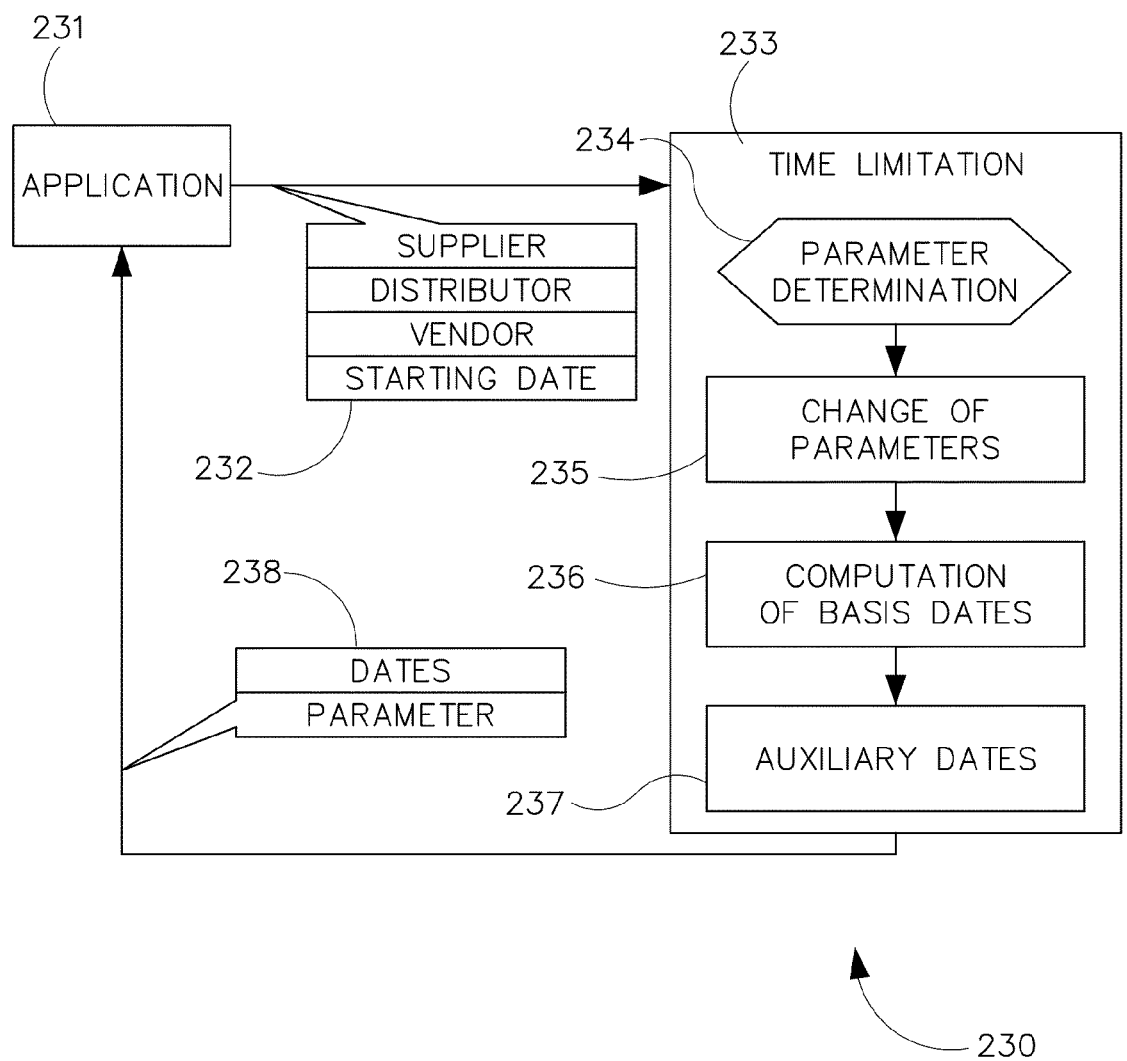
FIG. 7 depicts a method of scheduling in accordance with the principles of the present invention.

All other base dates are calculated based on one or more start dates. Subsequent dates are calculated by adding parameters and this is referred to as forward scheduling. Backward scheduling refers to the calculation of previous dates, and works on the basis of subtracting parameters. The start date therefore determines whether backward or forward scheduling, or possibly both, is used. FIG. 7 depicts the scheduling algorithm 230 on a simplified basis. The business application 231 provides information 232 such as supplier, distributer, vendor, start date, to a scheduling 233. Parameter determination 234 occurs with a calculation of the parameters 235, and a determination of the base dates' 236 and the additional dates 237. Dates and parameters 238 are provided back to the application 231.

As discussed above, the data calculation must be performed to both determine the dates initially and to synchronize the dates when a change is made. In one embodiment, the following data is transferred to scheduling to trigger date calculation: at least one start date, the supplier, the article, the goods recipient from the supplier's viewpoint (usually the distribution center). In addition, the following prerequisite applies as, scheduling does not check the start date for these criteria, the start date transferred has already been checked against the relevant valid calendars, and the order and delivery cycles.

In an initial step, the following parameters which are used for calculation, and described previously are determined from the data transferred prior to the date calculation: production time, transportation lead time, main transportation time, post-transportation time, goods receipt processing time—goods recipient, goods issue processing time—goods recipient, vendor calendar, transport logistics calendar, logistics calendar of recipient retail site, order cycle, and delivery cycle.

The production time is determined in the following order:
From the article master purchasing data
From the default values of the vendor master in the:
    Purchasing organization, vendor sub range, retail site
    Purchasing organization and vendor sub range
    Purchasing organization and retail site
    Purchasing organization In a preferred embodiment, if the system is unable to determine a value, the value ZERO is used. A corresponding message appears.

The transportation lead time is made up of the transportation time for the transportation lead phase and another constant. Both values are retrieved from the table of transportation times. The transportation lead time is taken into account if the corresponding indicator is selected in the transportation chain. The transportation chain required to access the table of transportation times is determined from the vendor master levels specified above. If no value is recorded here, the required scheduling data must be transferred manually. This can be carried out using a transportation chain or specific data from a transportation stage. The means of transport used is retrieved from the definition of the transportation stage.

The main transportation time is retrieved in the table of transportation times. The procedure described for the transportation lead time is also used to access the table.

The post-transportation time is made up of the transportation time for the post-transportation phase and another constant. Both values are also retrieved from the table of transportation times. The post-transportation time is taken into account if the corresponding indicator is selected in the transportation chain. In an exemplary embodiment, the procedure described for the transportation lead time is also used to access the table.

The goods receipt processing time is determined from the article master's logistics data. If the logistics view does not exist yet for an article and retail site, the system tries to determine the parameter from the logistics view of the reference article of the material group and reference site. In a preferred embodiment, if this fails as well, the system sets the value to ZERO and a corresponding message appears.

The goods receipt processing time is also determined from the article master's logistics data. The procedure described for the goods receipt processing time also applies here.

The vendor calendar is determined from the vendor master data. If the system is unable to determine a calendar, it calculates in calendar days instead of in working days. A corresponding message appears.

The logistics calendar is retrieved from the definition of the corresponding transport stage (preliminary stage, main stage, subsequent stage). If the system is unable to determine a calendar, it calculates in calendar days instead of in working days, as described in regard to the transportation chain. This calendar is determined from the retail site master data. If the system is unable to determine a calendar, it calculates in calendar days instead of in working days. A corresponding message appears.

The order (i.e., planning) cycle is determined in the following order:

From the logistics data for the article and the recipient retail site

From the logistics data of the material group reference article and the reference retail site From the material master data at the purchasing organization/retail site level. Here, the default values are maintained for the article master.

To determine the order cycle from the planning cycle, the purchasing department processing time are also identified. This is stored at the retail site level (Customizing settings for material requirements). The delivery cycle is determined in the same way as the planning cycle.

In one embodiment, once the parameters have been determined, a user is able to add parameters and change the values determined. A user can use these parameters to retroactively add to the scheduling process processes such as stock turnover or the payment of customs duties, which are not directly taken into account in this specification.

It is possible to use these parameters to calculate the base dates of the external process of the latest purchase order date up to the distribution center goods issue date. As a result, the start date must be within the date range. Thus, for example, in one embodiment the dates up to the distribution center goods issue date is calculated as the following example for calculating the latest purchase order date shows:

TABLE 6

| | | |
|---|---|---|
| Start date | = | Latest purchase order date |
| Material staging date | = | Latest purchase order date + production time |
| Issue date | = | Material staging date + Transportation lead time |
| Arrival date | = | Issue date + main transportation time |
| Delivery date | = | Delivery date + post-transportation time |
| Availability date | = | Delivery date + delivery center goods receipt processing time |
| Delivery center goods receipt processing time | = | Availability date + goods receipt processing time |

If scheduling is also handed over to a store, it is possible to determine the following parameters required to calculate the base dates "store goods receipt processing time" and "store presentation date:" store calendar, store goods receipt processing time, and transportation time of the internal process. These parameters are determined in line with the parameters of the external process, and may also be modified as described above. Once a store has been transferred, all base dates can be calculated. This means that a user can use this date as the start date. Based on the calculation example outlined above, both dates of the internal process can be calculated as follows:

store goods receipt processing time=distribution center goods receipt processing time+transportation time$_{internal}$ store presentation time=Store goods receipt date+ goods receipt processing time Once the base dates have been calculated, a user modification may once again be displayed for modification-free enhancement. This interface allows a user to automatically calculate the additional dates, based on a customer-specific logic. The base dates are also transferred using the interface, to arrange additional dates in the schedule bar.

In addition to the data described so far, other start dates and one or more other parameters can also be optionally transferred to scheduling. If several start dates are transferred, all missing base dates from the earliest start date up to the next specified date are calculated. Here, the start date that is transferred second chronologically, is not overwritten. It is the new start date for further calculations. This process is continued until the last missing base date has been determined. A prerequisite is that all missing base dates can be determined, and also fit into the specified time schedule.

If the date sequence cannot be adhered to by specifying several start dates, date calculation is terminated with errors in background processing. In an exemplary embodiment, an error message also appears to inform a user that incorrect entries have been made. If parameters—such as the production time, the goods receipt processing time or the vendor calendar—are transferred to scheduling, scheduling does not need to determine them. In particular, they are not replaced by other values. For example, in a hypothetical scenario, a supplier may have more goods in the warehouse. In this case, a user transfers online a production time value that is lower than in the master data. In this case, the production time is not retrieved from the master data. All base dates calculated and all parameters determined, including the calendar and order/delivery cycles, are returned to the calling application as the result of scheduling. A user is able to change these results, provided that the corresponding application would like to offer this option. In one embodiment, two types of date changes are possible: direct date changes and indirect date changes. In direct data changes, a user can directly overwrite the individual dates manually in the date maintenance dialog (as described above). Once a user has made a change, the system must check that the dates are in the correct chronological order. If an error is detected, the change is not carried out, and a corresponding error message occurs. In indirect date changes, if parameters are changed, the dates are recalculated using the changed values.

As previously mentioned, the handover date describes the time at which the risk for the goods switches over from the vendor to the purchaser. In an exemplary embodiment, the handover date is treated in accordance with the principles and rules of the relevant commercial code. Before the transfer date, the vendor carries the risk of transportation; after this date, the purchase is responsible.

The handover date and time is agreed contractually between the partners. International Commercial Terms (Incoterms) are usually used as a basis. Incoterms contain uniform rules regarding key obligations to be fulfilled by the purchaser and vendor within the framework of the main supply contracts in international trade. In particular, they govern the distribution of Transportation costs transfer, Transportation risk transfer, and obligation of diligence transfer (delivery of the documents or corresponding electronic notification).

Incoterms such as free on board (FOB), cost, insurance and freight (CIF), and delivered duty unpaid (DDU) are part and parcel of international trade and are constantly used on a global basis. Incoterms can also be used when trading goods at a national level. Currently, the Incoterms EXW (ex works), FCA (free carrier), and DDP (delivered duty paid) are available.

Figure 8:
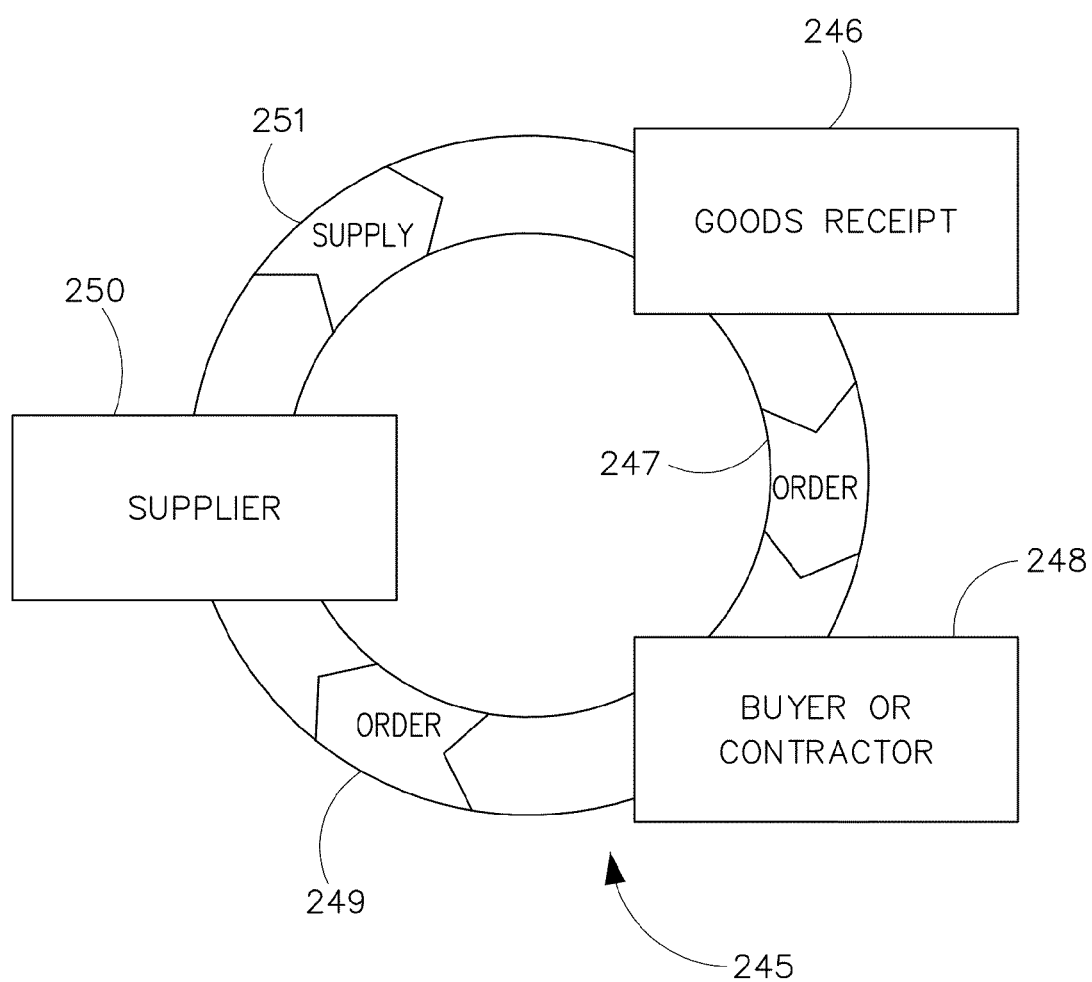
FIG. 8 is an overview of processes for a special order type third-party business.

The present invention may also be utilized in businesses and industries where third parties to orders are used. In third-party business, an order is carried out, the requirement being that a supplier has to perform a service for a third party (for example, a customer). FIG. 8 depicts an overview of the processes for the special order type third party business 245.

A goods recipient 246 contracts in a contract step 247 with a buyer or contractor 248 who in an ordering step 249 orders from a contractor 250 who performs the delivery step 251 to deliver to the goods recipient 246. This means that the article required by the customer is not delivered by the sold-to party. Instead, the order is passed on to an external supplier, who sends the article directly to the customer. In the processes of the present invention, the goods recipient is the store for third-party business. Thus, from the supplier's viewpoint, the distribution center corresponds to the sold-to party. For scheduling, this means that the warehouse process is not applicable.

Figure 9:
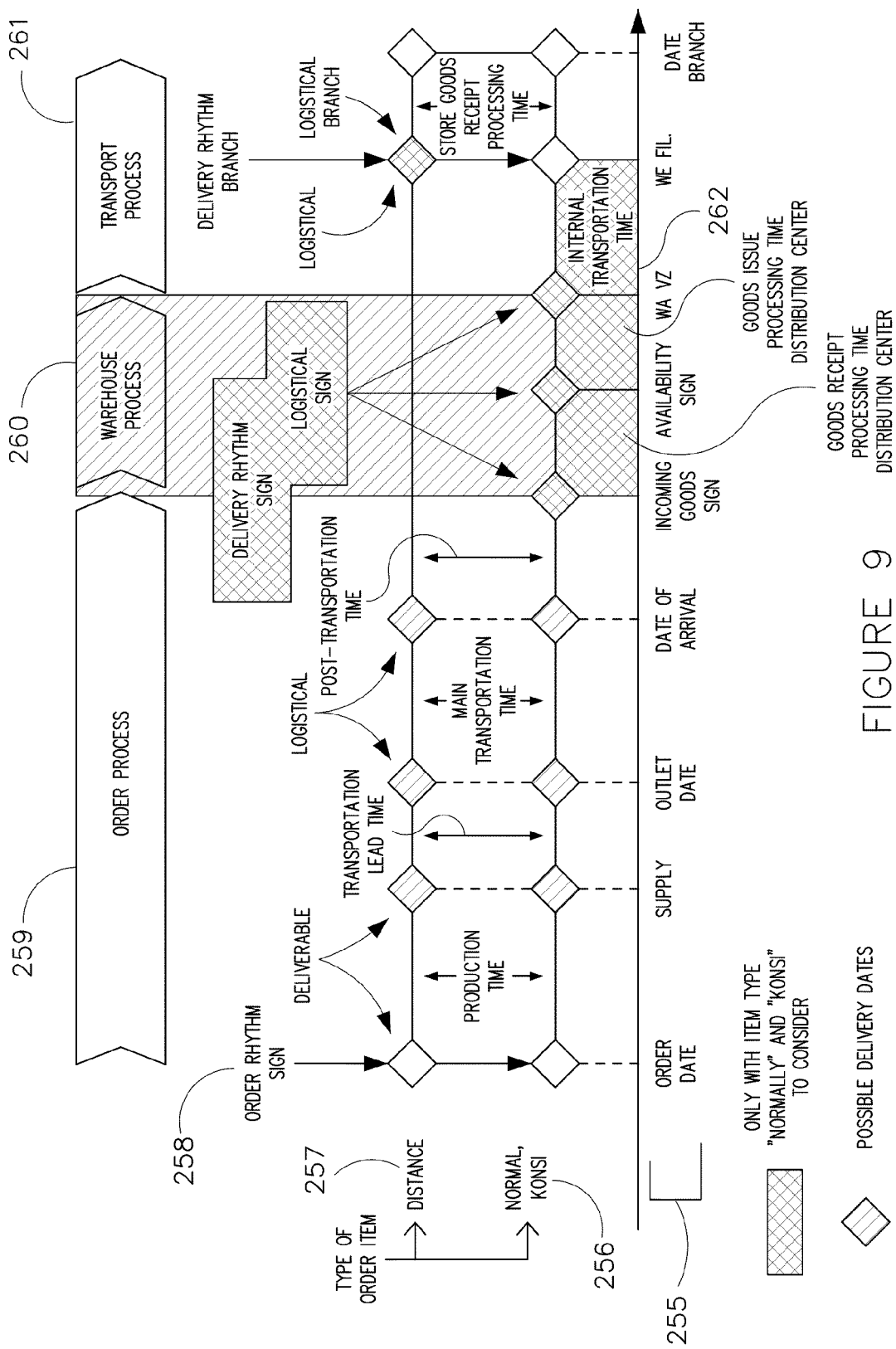
FIG. 9 depicts scheduling in the special order type third party business.

FIG. 9 depicts a chronological illustration similar to FIG. 4, but for the third party business application. Manufacturing process 259, warehouse period 260 and transport period 261 are all, phases in the movement of the goods. Delivery cycles 164 are illustrated in relation to normal 256 and roadway 257 deliver item category. Base dates 255 are also provided. The store must be transferred as the goods recipient. The scheduling milestones distribution center delivery date, distribution center availability, and distribution center goods issue are not applicable. The distribution center delivery date is also not applicable as the handover date. Instead, the store goods receipt date is a possible handover date. Dates are then calculated in the same way they are calculated for a direct order from the store to the supplier, the only difference being that the store is not the sold-to party.

Figure 11:
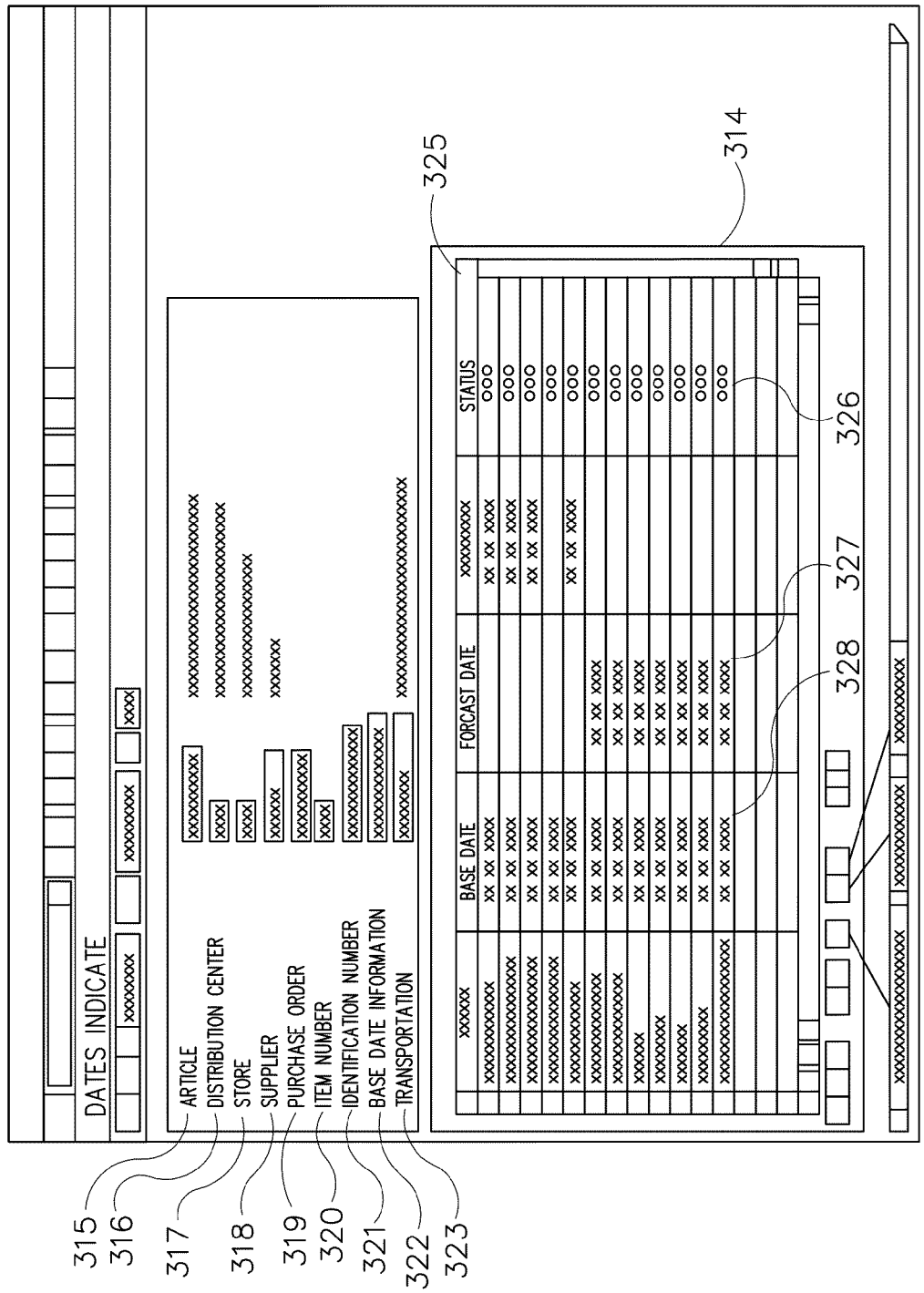
FIG. 11 shows the date maintenance dialog displayed on a graphical user interface.
Figure 12:
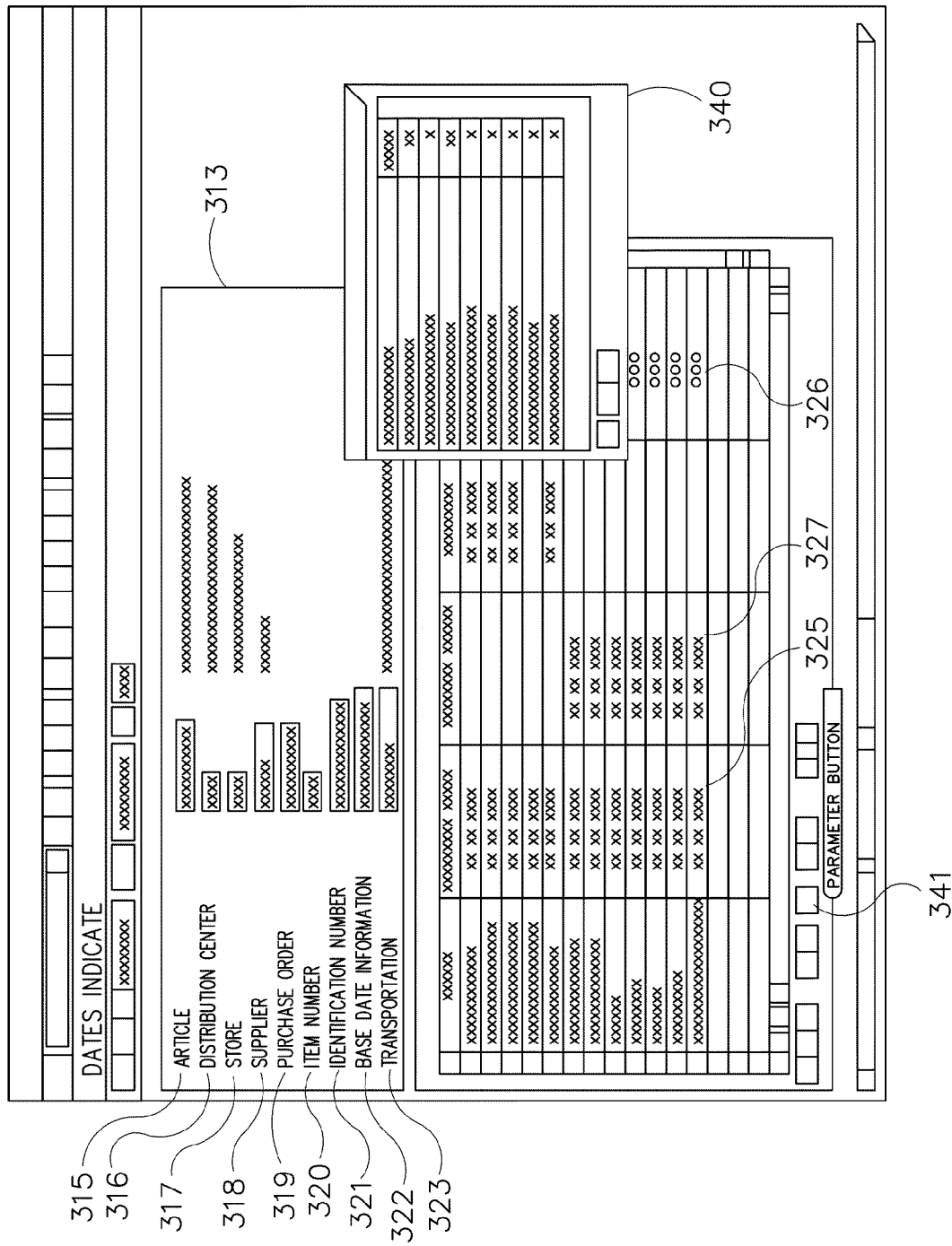
FIG. 12 is a display of parameters in the date maintenance dialog.

A user is able to display and manually change the base dates calculated by scheduling. FIG. 11 illustrates a date maintenance dialog screen 312. The maintenance dialog 312 is made up of two areas. The header data 313 is displayed in the top area. This data contains key information on the following basis required for date calculation:

Article number and description 315
Distribution center 316
Store 317
Supplier 318
Reference to the calling application, for example, purchase order with the purchase order number 319 and, if necessary, the item number 320
The identification number 321 used to record the dates on the database
Information 322 on the base date that corresponds to the handover date
Transportation chain 323

The base dates 328 and the additional dates are displayed in the chronological order of their target date in the second area 314. In one embodiment, if a user calls the dialog from the purchase order, actual dates that have already been posted, the forecast date 327 for the base dates 328, and the status 325 of a date are also be displayed as a traffic light icon 326.

The forecast date informs a user of the impact of date changes to subsequent base dates. The target date forecast is based on the last posted actual date for a base date. If the actual date corresponds with the target date, the actual dates of the base dates are transferred as the forecast date. However, if a date changes, the following calculation is carried out. The date forecast is carried out using the last posted actual date as the start date. Here, the parameters determined for the target dates already calculated are used again in this context. If the forecast date of the first base date that is on the start date is in the past, date forecasting is triggered again, and the current date is used as the start date.

The traffic light status shows the result from the comparison of the forecast date and the original actual date, taking account of the tolerances recorded in the event management system.

If the difference between the forecast date and the original target date is greater than the tolerance, the traffic light is set to red.
If the difference is less than the tolerance set, the status is set to yellow.
If an actual date has already been posted, or if the actual data has not passed, the traffic light status is set to green.

Figure 14:
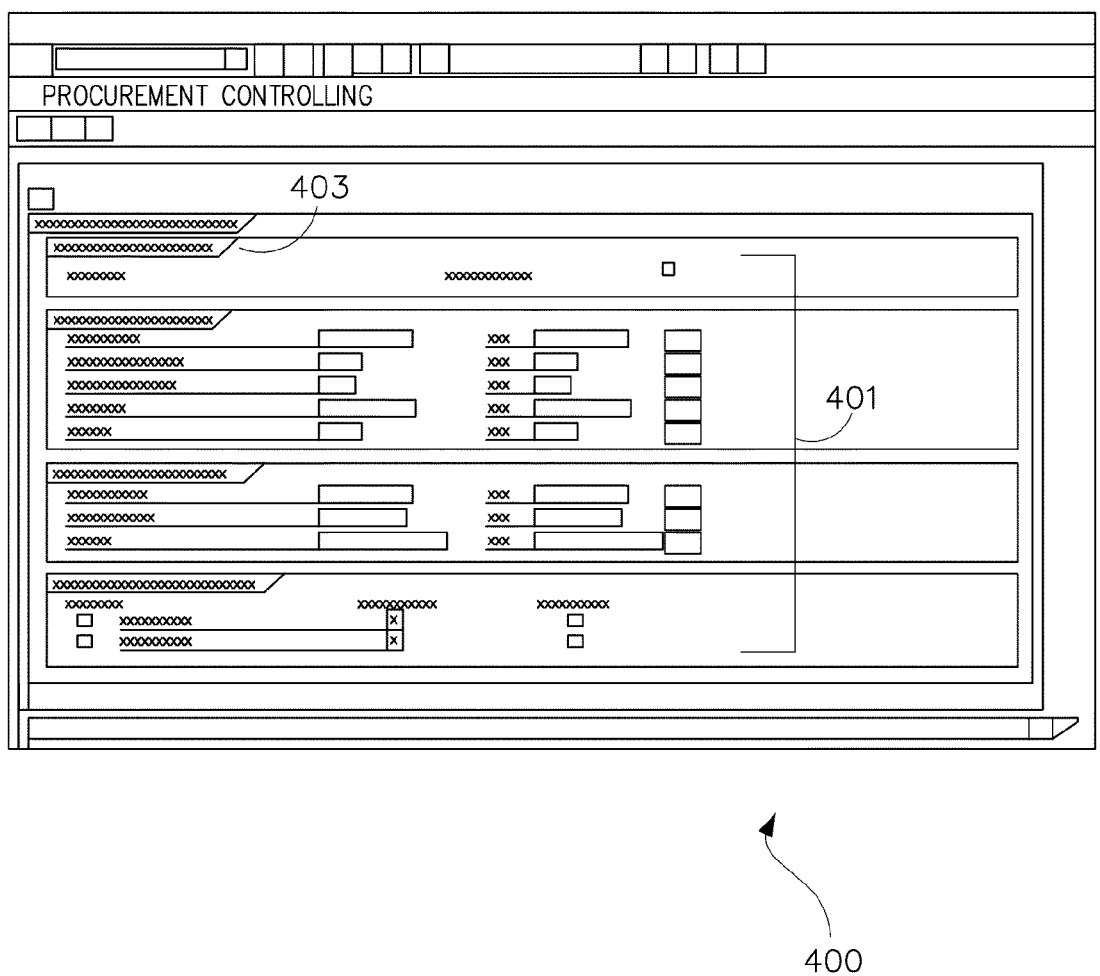
FIG. 14 depicts a reactive view selection screen.

As of the time of date monitoring—that is, as of the purchase order generation—only the dates to be monitored in the event management system are displayed in the date maintenance dialog. The event management system controls these dates. In one embodiment, the date maintenance dialog provides the following functions:

A user is able to manually change in change mode the target dates for which no actual date has yet been posted.
A user is able to manually create additional dates in change mode.
A user is able to display and change the values of individual parameters (see FIG. 14 showing the parameter button 341 activated to display a parameter display subscreen 340).
A user is able to replace the transportation chain on which the schedule bar is based with another transportation chain. Alternatively, a user is able to go to the transportation chain dialog and change the existing transportation chain, or create and assign a new transportation chain.
Instead of replacing or revising the entire transportation chain, a user is able to change the parameters of the main transport manually. These changes automatically have an impact on the preliminary transportation phase.
It is possible to simulate the impact that changes to individual dates, parameters or transportation stages have on subsequent base dates. The simulation triggers a recalculation of the dates that are still open.
A user is able to display the date history, that is, any changes that have been made to the target dates.

Figure 13:
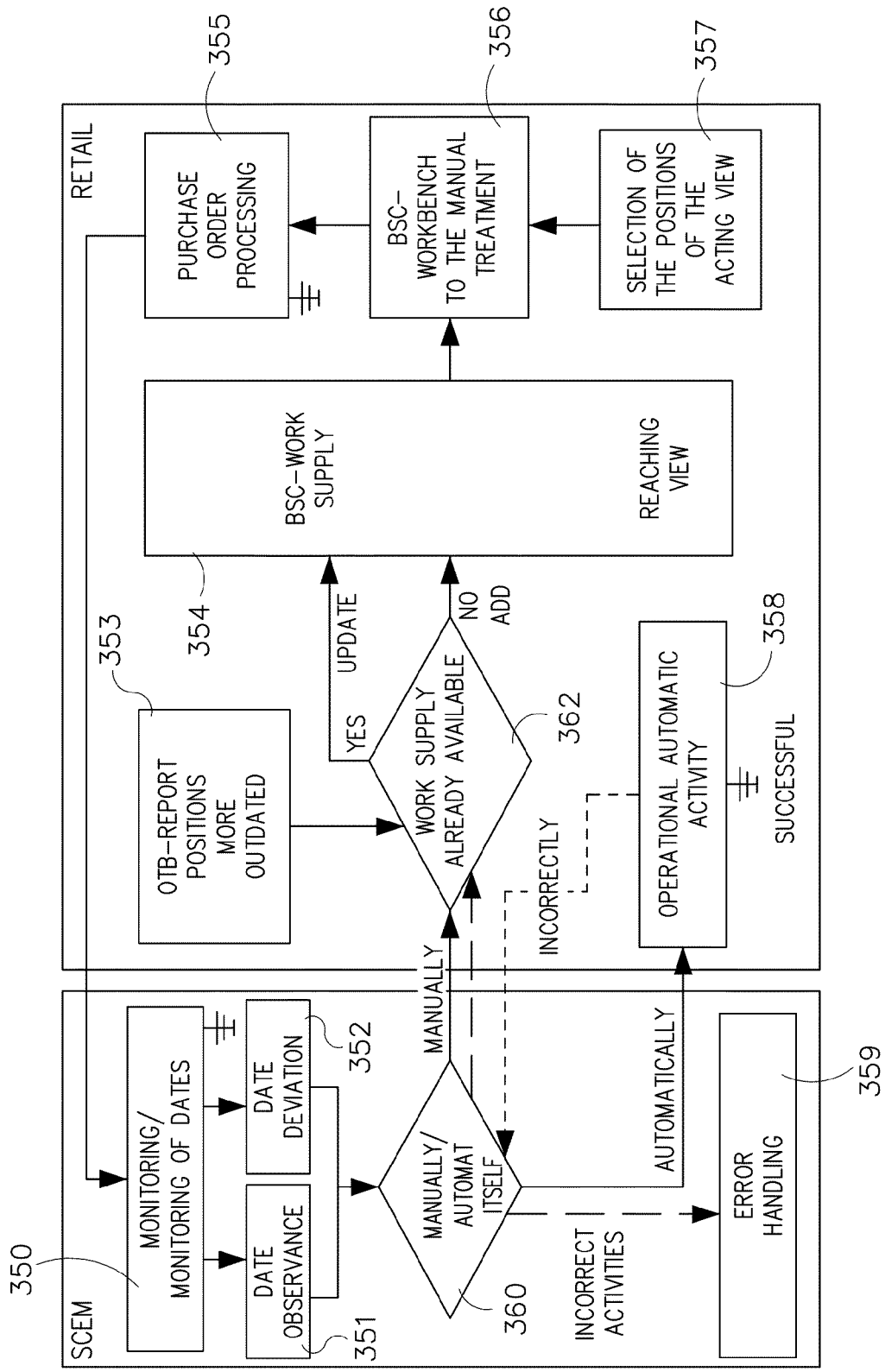
FIG. 13 illustrates a procurement monitoring process overview.

Procurement Monitoring aims to inform a user of any delays, based on dates in the procurement process chain, and identify any action required as regards operational handling, or automatically carry out any activities required to support this action. This is termed the reactive approach. FIG. 13 illustrates a general overview of the procurement monitoring process. Active view 357 is selected and the procurement workbench 356 is activated and the catalog number adapted 355 to feed into the date step 350. The date is monitored in step 350. The date is either adhered to 352 or not adhered to 352. In step 360, either a manual handling or an automatic rule is applied. Defect handling step 359 feeds into an automatic operation step 358 which feeds back to the step 360. Step 362 is fed by step 360 (if manual) and step 353 (OTB reporting). Step 362 determines if the order already exists and feeds into step 354 (inventory), which feeds into the procurement workbench 356. Procurement Monitoring also aims to support stock control from the point of view of goods flow (external purchase orders). To this end, it identifies the current external purchase order situation and the purchase order status along the procurement process chain. This is referred to as the active approach. The event management system supports procurement monitoring by tracking dates and carrying out activities if the monitoring criteria/control parameters are fulfilled.

A user can define monitoring criteria and control parameters for a schedule milestone in the procurement process in the event management system. A user can also define several activities for the defined monitoring parameters, which are triggered if the monitoring criteria/control parameters are fulfilled. For example, in a hypothetical scenario, a user define the monitoring criterion "Delivery date not adhered to" for the delivery date. A user also specifies the control parameter "Target date passed 3 days ago." If the system establishes that the monitoring criterion and the control parameter are fulfilled during monitoring, the activity "Write reminder to vendor" is triggered. The activities are broken down into automatic and manual activities. For automatic activities, the activity is directly triggered from the event management system. The manual activities are transferred to the procurement monitoring worklist in the business system.

In addition to the embodiment described above, the procurement monitoring workbench may include various functions as follows. In one embodiment, these functions are considered standard to a business system of the present invention. In one embodiment, automatic date shifting occurs if actual date is not adhered to. This function moves a date, if the original target date was no adhered to. It can be implemented automatically in the background or manually using the procurement monitoring workbench. A user can record the number of days by which a date is moved, based on the current date. Fashion Scheduling is used to carry out the date shift and recalculate the subsequent dates In the manual process, the recalculated dates appear as proposed dates. A user can change these dates manually or transfer them without editing them further.

In one embodiment, a reminder function allows a user to create a reminder and send it to the supplier if the handover date is not adhered to. It is possible to use the following criteria to determine the reminder characteristics: the number of reminders and the corresponding reminder levels, the fixed business indicator, and the indicator for cancellation threats created. When a user creates a reminder manually, a user also has the option of setting a final deadline in the reminder. A user is able to do this by setting the cancellation threat either at the purchase order header level or the item schedule line level. After a reminder has been created, the number of reminders is updated in the purchase order and in event management system. A user is also able to move the handover date. A user is able to use the message control of the reminder function to define the form for writing reminders and assigning them to the corresponding vendor.

In an exemplary embodiment, a threat cancellation can be set. If a user sets a cancellation threat, the user is able to change it manually in the purchase order, or trigger it as a function in the Procurement Monitoring Workbench. A user os also able to use the cancellation threat to control the writing of a cancellation. In this context, a corresponding form is created with a note for cancellation threat.

In one embodiment, it is possible to cancel open purchase order items or purchase order items that have not been fully delivered by closing the item (for example, setting the delivery completed indicator) in the purchase order. When a user closes the item in the purchase order, the outstanding delivery quantity is automatically set to zero.

When a user cancels a process, the system checks whether the subsequent processes (for example, goods receipt, invoicing) allow a cancellation, irrespective of whether the cancellation was carried out manually or automatically. If a user cannot cancel the purchase order, the transaction is terminated, and transferred to manual procurement monitoring processing, together with a note of the reason for termination.

In one exemplary embodiment, a function is provided to create a cancellation notification. This function allows a user to send the supplier a cancellation notification if a user cancel an item/schedule line/open remaining quantities. The cancellation notification and the definition of the corresponding form is created using message control in line with the writing of the notification. Executing the function triggers the subfunction creating and sending the cancellation notification.

As already described above, it may be possible that several activities can be stored for a monitoring criterion/control parameter. It is possible to trigger a specific activity, rather than all activities, if specific monitoring criteria/control parameters are fulfilled. For example, in one hypothetical scenario, the monitoring criterion "Delivery date has passed" and the control parameter "Target date passed three days ago" are defined for the delivery date. If the system establishes during monitoring that the criteria and the control parameter have been fulfilled, either the activity "reminder 1, reminder 2, further reminder" is carried out, or if the last reminder contained a cancellation threat, the process is cancelled. To determine the correct activity in the event management system, the following operative data is used. This is transferred from the business system to the event management system during the transfer of dates.

TABLE 7

| Additional Information | Description |
| --- | --- |
| Purchase order number | Required to uniquely identify the item schedule line to be processed |
| Purchase order item | (The schedule line level is the smallest item unit with a delivery date) |
| Schedule line | |
| Number of reminders | Represents the number of reminders already sent |
| Cancellation threat | Allows the assignment of a corresponding activity after the second reminder in the event management system. If notification of a cancellation is sent with the second reminder in the Procurement Monitoring Workbench, a cancellation threat is issued |
| Delivery completed | Delivery completed represents the final delivery in the purchase order. Usually the delivery is completed when the entire purchase order quantity has been delivered. In the event management system, the system checks once goods have been received whether the delivery fulfils the entire purchase order quantity. If the delivery does not complete the delivery, this information trigger an activity that results in a reminder being sent or the remaining quantity being cancelled. |
| Fixed business | Fixed business is used in the external purchase order if the delivery date is defined as binding. If delivery is delayed, the purchase is entitled to immediately withdraw from the purchasing contract. This information is required in Procurement Monitoring to control the reminder procedure. |

In one embodiment, this specified information is stored redundantly in the event management system. It is used to uniquely assign an activity to a defined monitoring criterion/control parameter in the vent management system. To display the activities in the worklist, it is possible to add data from the live system that is not administrated in the event management system.

In a preferred embodiment, various combinations of the above described functions may be used. In a preferred embodiment the functions described above are available as individual functions to Procurement Monitoring and can be used in a specific sequence provided the following framework conditions have been fulfilled:

TABLE 8

Permitted Combination of Activities
Cross table (Permitted combination of functions)

| Attribute/Function | Permitted function | | | | | |
|---|---|---|---|---|---|---|
| Calculate new delivery date | | X | X | X | | |
| Create and send reminder | X | | X | X | | |
| Change delivery date | X | X | | X | | |
| Set cancellation threat | X | X | X | | | |
| Set delivery completed indicator (cancel) | | | | | X | |
| Create cancellation notification | | | | | | X |

When a user triggers the activity in the event management system, the attributes for implementing the corresponding functions are transferred to the business system. These attributes are placed as proposals in the worklist for manual handling. A user is able to use a function in the business system to implement for a worklist item the corresponding attributes (sub-functions) in a specified sequence in one transaction. In one embodiment, the event management system supports deadline monitoring.

If the event management system establishes when monitoring dates that a monitoring criterion and the corresponding control parameters have been fulfilled, an activity is triggered from the event management system.

If the activity is triggered manually, the event management system transfers it to a standard interface. The interface transfers this activity to the Procurement Monitoring worklist. It is possible to use the standard interface mentioned above for manual activities that are transferred to the worklist of procurement monitoring. The manual activity refers to a purchase order/purchase order item and/or schedule line of an external purchase order.

If an automatic activity is triggered from event management system, it triggers a corresponding function directly in the business system. When the function is triggered, the system simultaneously monitors the execution of the function, to ensure that this could be implemented correctly.

If a function triggered in the event management system is not implemented correctly in the business system, the business system standard error message is sent to the events management system. The error message provide information on why the automatic activity could not be implemented.

In one embodiment, in line with the manual handling of activities, the information is transferred to the worklist in the business system, together with the assigned error message, by the call of the standard interface. This procedure ensures that a user is able to edit the incorrectly edited automatic activities from Procurement Monitoring in the Procurement Monitoring Workbench.

To uniquely assign the activities to a corresponding business system order, the following basic data must be transferred when the activity is triggered from the event management system (for example, during the transfer to the worklist). This basic data applies for both the manual and automatic activities.

TABLE 9

| Basic Information | Description |
|---|---|
| Purchase order number Purchase order item Schedule line | Uniquely identifies the item schedule line to be processed. (The schedule line level is the smallest item unit with a delivery date) |
| Calculate new delivery date | This information is used to provide information from the event management system to the |

TABLE 9-continued

| Basic Information | Description |
|---|---|
| Create reminder Set cancellation threat Set delivery completed indicator (cancel) Create cancellation notification | procurement monitoring worklist regarding the activities that is implemented. |

The corresponding fields are transferred to the business system worklist as decision-making information for the Procurement Monitoring Workbench.

TABLE 10

| Additional Information | Description |
|---|---|
| Number of date shifts | In event management system, the actual date changes are counted, so that a user can recognize how many times the date has already been moved when a user manually edit the activity. The date change is counted each time a change is transferred by the business system to the event management system. |
| Error log of automated activities | If an automated activity is not carried out correctly in the business system, the field is filled with the cause of the error. This information help a user to continue manually editing entries in the procurement monitoring workbench. |
| Number of reminders | Displays the number of reminders that has already been sent |
| Cancellation threat | Provides information on whether a cancellation threat was issued (at the earliest) for the last reminder |
| Fixed business | Displays a user's rights within the framework of the purchasing contract. |

In one embodiment, contrary to the automated handling of activities, manual activities are transferred to the worklist. The procurement monitoring worklist is updated by different processes. These are items that result from a scheduling or quantity change or from the assignment of items to an obsolete OTB budget. The event management system updates items that relate to scheduling or quantity changes.

In a preferred embodiment, the following basic information is used to edit standard activities using the procurement monitoring workbench:

TABLE 11

| Basic Information | Description | Origin |
|---|---|---|
| Purchase order number Purchase order items Schedule line | This information is used to uniquely assign the purchase order to the activity to be implemented. | Event Mgr |
| Number of reminders | Displays the number of reminders that has already been sent | Event Mgr |
| Cancellation threat | Provides information on whether a cancellation threat was issued for the last reminder | Event Mgr |
| Error log of automatic activities | Provides information on which errors resulted in termination when the activities were implemented automatically | Event Mgr |
| Assignment to OTB | Displays the OTB to which the purchase order is assigned. This plays an important role for editing obsolete OTB budgets | OTB |
| Other purchase order in which the articles appear | Provides information on whether the articles in the Procurement Controlling worklist appear in other purchase orders. This information help a user decide whether a user should insist | Business System |

TABLE 11-continued

| Basic Information | Description | Origin |
|---|---|---|
| | that the remaining quantities of the delivery be delivered. Alternatively, a user can choose to cancel the remaining quantity. A user are only informed if the item is available for cancellation in the worklist, or if the delivery completed indicator was not selected after goods receipt (= potential remaining quantity cancellation). Another dialog box appear to display detailed information such as the purchase order number, purchase order quantity, and delivery dates for the purchase order item. | |
| Fixed business | This informs a user that the purchasing contract type is a fixed delivery target. For this form of purchasing contract, different rights and obligations apply for the purchaser and supplier if delivery is delayed. | Event Mgr |
| Delivery difference | Displayed for items/schedule lines for which (at least) one good receipt already exists. This information help a user decide whether a user would like the remaining quantity to be delivered, based on the outstanding quantity. | Business System |
| Calculate new delivery date Create reminder Set cancellation threat Set delivery completed indicator | This information is used to provide information from the event management system to the Procurement Monitoring worklist regarding the activities that is implemented. | Event Mgr |

In an exemplary embodiment of the invention, information contained in the worklist may be added to, modified, or deleted. When an item is transferred to the worklist, the system checks whether this item already exists in the worklist. If it does not exist, it is added.

Before an item is updated in the worklist, the system checks if it already exists there. If it does, the contents are updated or supplemented based on the new information. There may be existing items if two sources determine the same item. For example, based on the monitoring criteria and control parameters, the event management system determines on Mar. 1, 2003, that the delivery date has passed, and that a reminder is sent for the purchase order item. Up to Mar. 3, 2003, the item was not edited in the procurement workbench. On March 3, 2003, the OTB report establishes that a purchase order item is assigned to the obsolete OTB budget delivery date February, as the delivery date for the purchase order was Feb. 28, 2003.

An item is deleted in Procurement Controlling if the corresponding purchase order item fulfills the necessary criteria. In one embodiment, the criteria are: the purchase order item has been cancelled, the purchase order item has been logically deleted, the worklist item is marked as completed.

A user can manually mark a worklist item as completed. This can be set freely by the user. This is only useful if all necessary activities have been carried out.

A report is used to actually delete the items from the worklist. This report uses the above-mentioned criteria to check whether the item can be deleted. If one of the criteria applies, the item is removed from the worklist.

In one embodiment, as discussed above, a user may use the procurement monitoring workbench to manually edit activities in the worklist (reactive view) or to edit purchase order items that result from the current purchase order situation (active view). Both views—the reactive and active—are made available.

Figure 15:
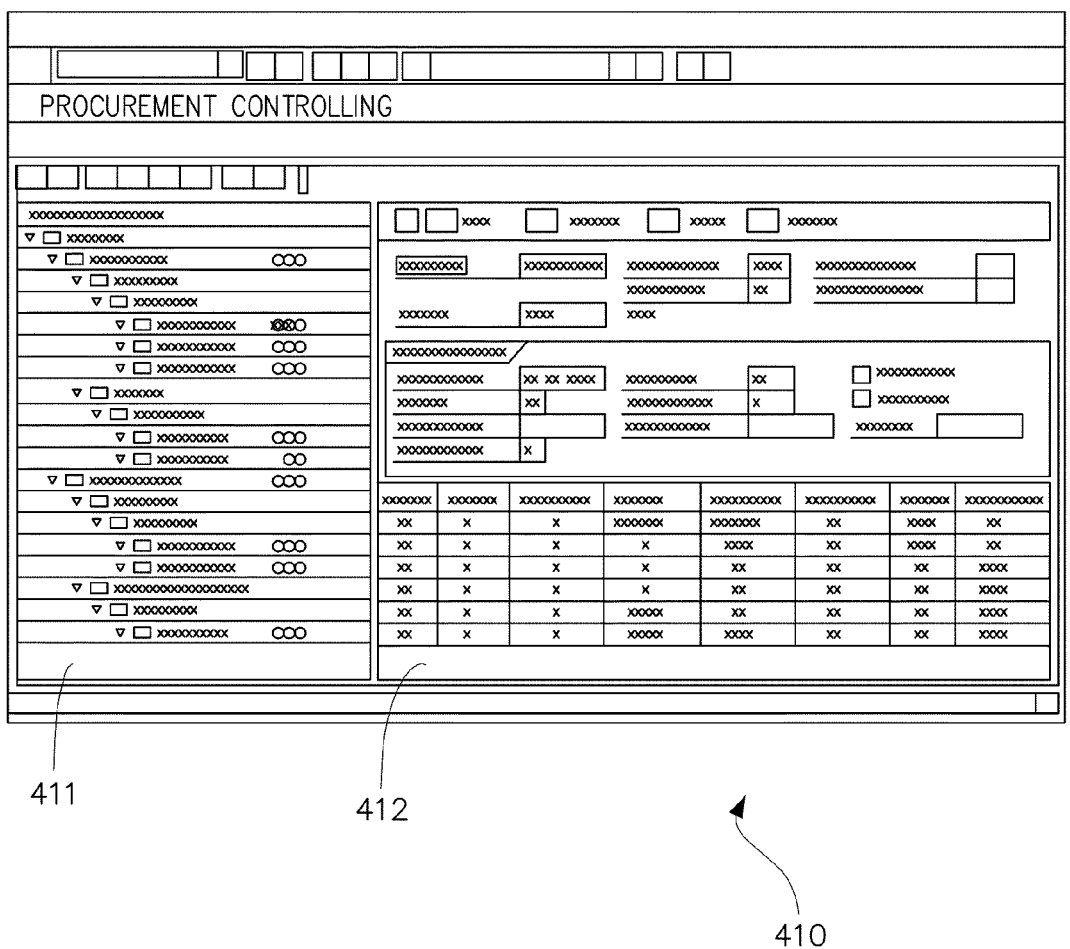
FIG. 15 shows a reactive view item overview screen.

Tasks to be fulfilled by the reactive view:
Display items that are assigned to an obsolete OTB budget, display delivery quantity variances, delivery date variances, and items to be deleted. The activities are determined by the business system (obsolete OTB budgets) and the event management system, and placed in the worklist.
Process the above-mentioned items using the activities and functions described above
Move the delivery date to a current or future delivery period
Tasks to be fulfilled by the active view:
Display the current purchase order situation in purchasing, based on the date milestones defined in Procurement Controlling
Edit the purchase order items within the framework of purchase order change functions FIG. 14 shows one embodiment of the reactive view display 400 of the Procurement Monitoring selection screen. In one embodiment, a user is able to determine the procurement controlling view on the initial screen. A user is able to use the selection criteria 401 defined on the initial screen to display specific data from the worklist in the subsequent item overview screen 410 (FIG. 15). From this screen, a user is able to go to the item overview of the reactive view. An indicator 403 is provided to indicate reactive view is active.

FIG. 15 depicts an embodiment of the Procurement Controlling item overview 410. The item overview is be structured based on the selection criteria that a user defines. The overview is broken down into two main areas. As shown, the worklist structure appears on the left screen area 411. A user can use the items in this area to display data on the right screen area 412. All items to be processed appear on the right screen area 412. The activities for the selected corresponding item are triggered by selecting the item and choosing the relevant function.

Figure 16:
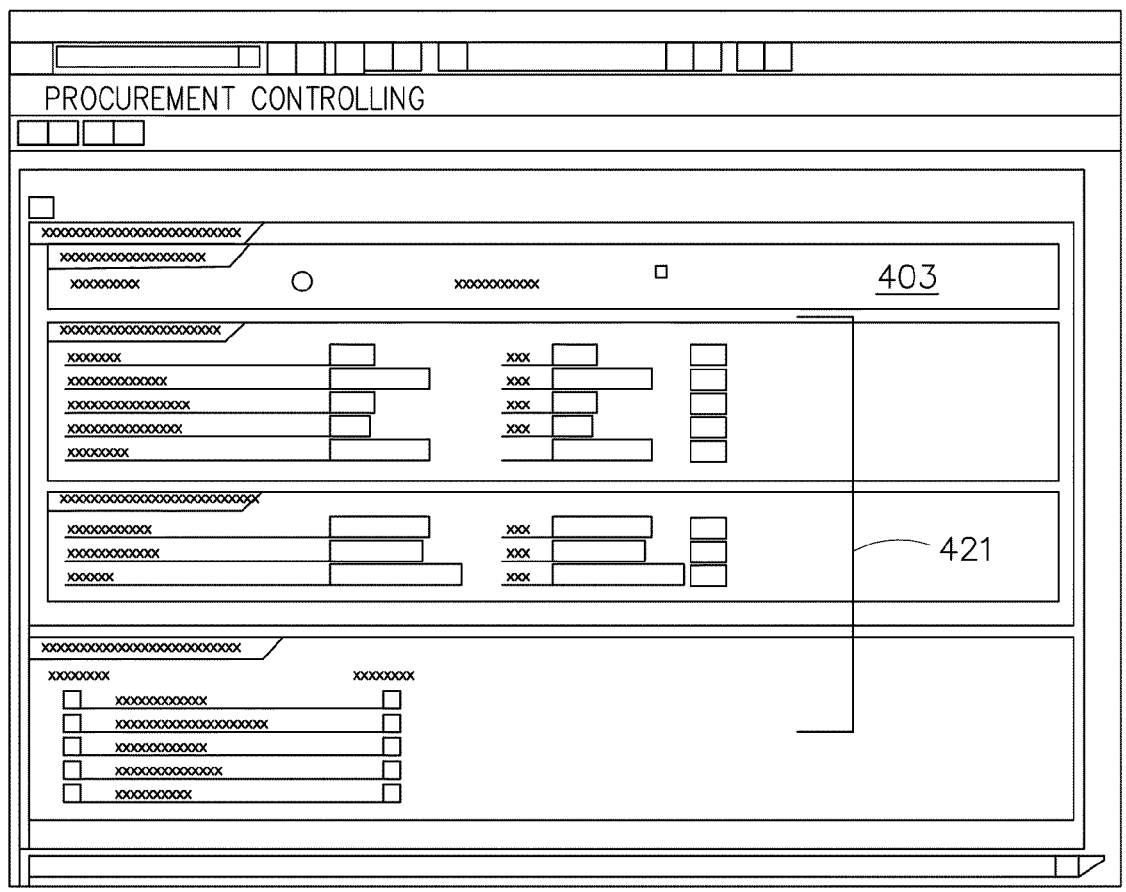
FIG. 16 depicts an active view selection screen.

FIG. 16 shows the active view of the Procurement Monitoring selection screen 420. An indicator 403 is provided to indicate reactive view is active. A user is able to determine the Procurement Monitoring view on the initial screen 420. A user is able to use the selection criteria 421 defined on the initial screen 420 to display specific data from fashion operative purchase order processing or from the order due list. In the order due list, a user selects items from the grouped and ungrouped order due list. A user is able to go to the purchase order list for order due list items. A user is able to use functions from the active view for these items. In the purchase order list, a user is able to implement standard purchase order list functions. From this screen, a user is able to go to the item overview 430 (FIG. 17) of the active view.

Figure 17:
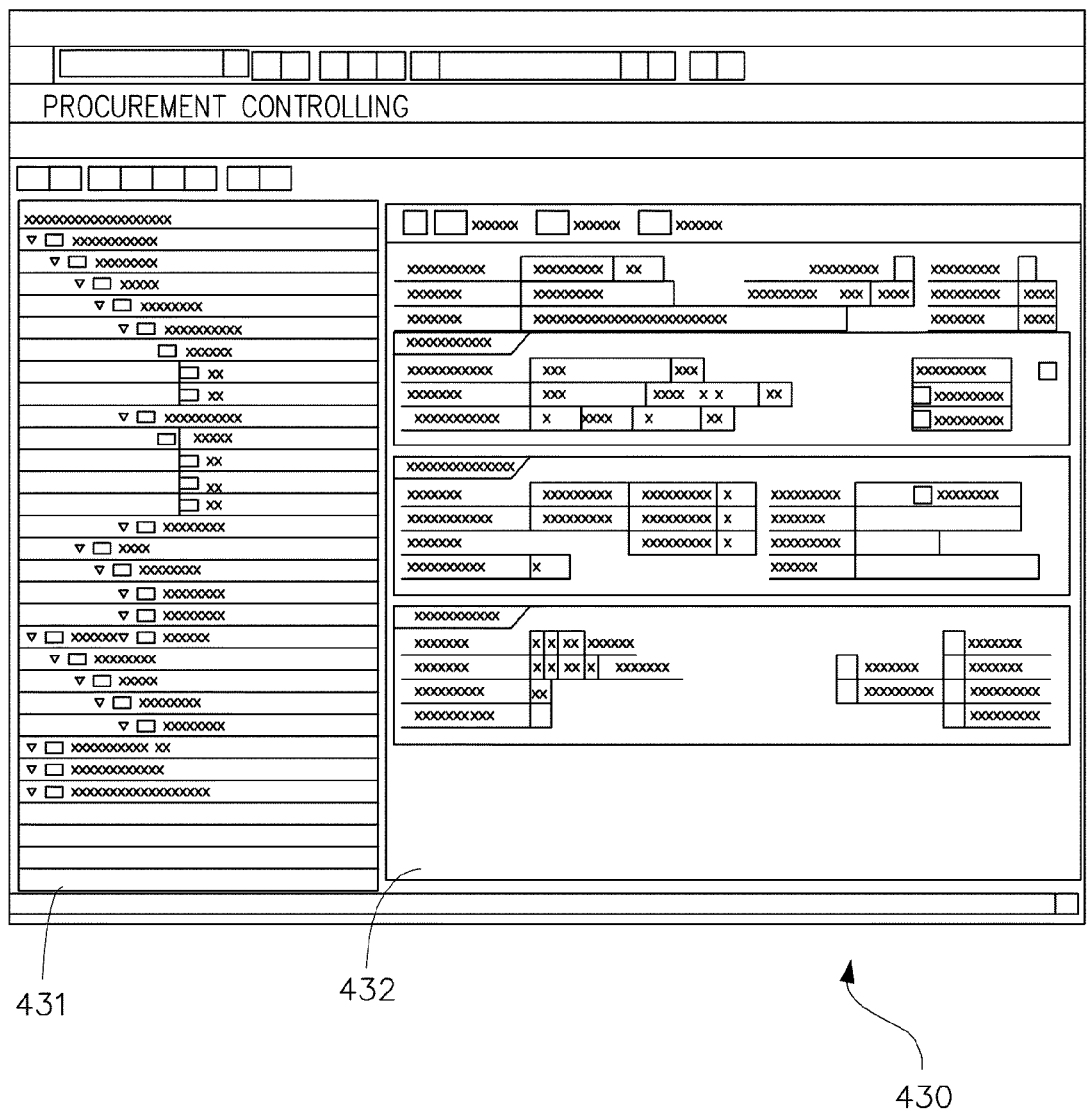
FIG. 17 shows an active view item overview.

FIG. 17 depicts the Procurement Controlling item overview 430. The structure of the selected purchase order situation is displayed based on the selection criteria chosen. The overview is broken down into two main areas. As shown, the worklist structure appears on the left screen area 431. A user can use the items in this area to display data on the right screen area 432. All items to be processed appear on the right screen area 432. A user can select the item and go to purchase order change mode or the order due list to carry out the required change. This usually involves changing the quantity or date, canceling external purchase order items or deleting items that have not yet been ordered (from example, those from the order due list).

In one embodiment, some applications of the business system may utilize the dates prior to the generation of a related purchase order. All applications that use the dates before purchase order generation keep these at the item level.

It is possible to merge the dates once the purchase order has been generated. The number of dates to be kept in the business system is the same as the number of items. It is possible to merge these dates, if required, when the purchase order is generated and if the dates of the individual purchase order items correspond with each other. A data record is created for the schedule bar of the deviant items. One data record is generated for each schedule bar. The schedule bar is deleted by the deletion of the corresponding purchase order.

In one embodiment, the size of the data set may be reduced based on the relevant transportation chains. Thus, the data volume is reduced accordingly if different transportation chains use the same transportation stages (lead, main, and post-transportation times).

The number of events to be monitored depends on the number of different schedule bars. In a preferred embodiment, date monitoring is carried out at the item level. The total number of dates to be monitored equals:

(Number of base dates to be monitored+Number of additional dates to be monitored)*Number of purchase order items to be monitored If all purchase order items in a purchase order have the same dates, then the number of schedule bars equals the sum of all purchase orders to be monitored. In a purchase order, preferable only a small number of items have different dates. If the dates of the items in a purchase order do not correspond to each other, an additional schedule bar is generated for the deviant items.

Total number of dates to be monitored=(Number of base dates to be monitored+Number of additional dates to be monitored)*Number of purchase order headers to be monitored+(Number of base dates to be monitored+Number of additional dates to be monitored)*Number of deviant purchase order items to be monitored The number of procurement monitoring worklist items depends primarily on the number of delivery date overruns. The size of the schedule bar also plays a key role. In an exemplary embodiment, a user may control the number of items apparent in the procurement monitoring worklist, such as by deleting worklist items. Deleting the worklist items that have already been processed reduces the number of items in the worklist. The deletion of these items depends on the speed with which the delivery item is delivered after the first overdue date, and on the frequency with which the delete able worklist items are deleted. In another exemplary embodiment, the size of the worklist is reduced by using the operative automatic activities on a comprehensive basis.

In one exemplary embodiment, a user is able to customize the settings for the business system in accordance with the user's needs. For example, in one embodiment, a user is able to determine whether the schedule bar is generated at the purchase order header or purchase order item level. In another embodiment, a user is able to customize the fashion scheduling system in the following ways: location code for trade and transport (if the new table is empty, a user maintains the required location codes in customizing; maintenance of fashion shipping types); assign Incoterms to the base dates (which can also be a handover date; define additional dates, if required). In another embodiment, a user may modify procurement monitoring by: settings for the number of days by which a date is moved or defining and monitoring a user's own procurement processes.

It is possible in an exemplary embodiment for a user to use the monitoring results, which can be processed in procurement monitoring, and the pertinent processing functions that are available, to place a user's own monitoring results in the procurement monitoring worklist and edit them using a user's own functions added to the business system. To this end, the following embodiments are described. In order to be able to enhance customer-specific monitoring results and incorporate their functions, these are based on the basic information of purchase order, purchase order item, and schedule line.

A user is able to use a modification to add a user's own fields and their contents to procurement monitoring worklist items. For example, a user can decide to make the reminder procedure and the deletion of items dependent on the purchase order value. In which case, the field "Purchase order value of the item/schedule line" are displayed in procurement monitoring.

A user is able to customize the business system to define additional folders (for example, sanction) for the reactive view. The standard functions (dates, reminders and cancellation) are not made available for the items in the folder. However, a user is able to define customer-specific functions by modifying the business system. A user is also able to use add functionality to the business system to define other folders (for example, distribution center stock view) for the active view. However, a user is not able to go to purchase orders from this folder and the user uses the modification to define other functions.

Embodiments within the scope of the present invention include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

In some embodiments, the present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art appreciate that such network computing environments typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

It is important to note that the above-described preferred and alternative embodiments of the present invention are illustrative only. Although the invention has been described in conjunction with specific embodiments thereof, those skilled in the art appreciate that numerous modifications are possible without materially departing from the novel teachings and advantages of the subject matter described herein. For example, although the stores in FIG. 8 above are illustrated and described as being linked directly to the assortments, the assignment could be via assortment versions as with the products. Similarly, the assortment versions used for linking the products to the assortments could be eliminated and instead the products linked directly to the assortments. As another example, the articles described in the foregoing exemplary embodiments could be pre-packed articles that comprise standard collections of sizes and/or colors or other variants of each article. Accordingly, these and all other such modifications are intended to be included within the scope of the present invention. Other substitutions, modifications, changes and omissions may be made in the design, operating conditions and arrangement of the preferred and other exemplary embodiments without departing from the spirit of the present invention.

What is claimed is:

1. One or more computer-readable storage media comprising program code stored therein executable by one or more machines to perform an automated process for monitoring procurement of a product via an event management system in a computerized business system, the automated process comprising the steps of:

generating, by a purchase order program module via one or more processors, a purchase order, the purchase order comprising a purchase order generation date and a product delivery date;

transferring the purchase order generation date and the product delivery date to the event management system;

calculating, by a calculation program module via one or more processors, a purchase order trigger date, a distribution center delivery date, and a store receipt date based on the product delivery date, the calculation program module configured to calculate dates based on product data;

calculating, by the calculation program module via one or more processors, a first set of dates based on the product delivery date and a second set of dates based on the product delivery date, the first set of dates comprising a material staging date, an issue date, an arrival date, a handover date, and a distribution center storage date, the second set of dates comprising an order confirmation date, a quotation sample date, a sample photo date, a sample size date, a sample date, and a labeling date;

generating, by a scheduling program module, a schedule bar based the purchase order trigger date, the distribution center delivery date, and the store receipt date via one or more processors;

providing, by the schedule program module via one or more processors, the schedule bar in the event management system, the schedule bar comprising the purchase order trigger date, the distribution center delivery date, the product delivery date, and the store receipt date;

triggering, by a procurement program module via one or more processors, an activity based on at least one of the distribution center delivery date, the product delivery date, and the store receipt date exceeding an actual date;

wherein the second set of dates exceeding the actual date has no effect on the first set of dates;

assigning an identification number to each respective purchase order;

storing the activity in a business warehouse;

merging dates generated at the item level prior to purchase order generation with the purchase order dates when the individual purchase order items correspond and creating a data record in the schedule bar for individual purchase order items which do not correspond; and providing a schedule bar for each respective purchase order generated;

wherein the calculation of the purchase order generation date, the product delivery date, the purchase order trigger date, the distribution center delivery date, and the store receipt date are based on data from a vendor calendar, a logistics calendar, a distribution center logistics calendar, a store logistics calendar, an order cycle of an ordering retail site, and a delivery cycle of a recipient retail site; and wherein the vendor calendar includes information regarding a work schedule of a vendor of the product, the logistics calendar includes information regarding transportation routings, the distribution center logistics calendar includes information regarding a schedule of a distribution center to which the product is to be delivered, the store logistics calendar includes information regarding a schedule of a store in which the product is to be sold, and the delivery cycle indicates days on which the product is delivered to the recipient retail site.

2. The one or more computer-readable storage media for procurement monitoring of claim 1, wherein the purchase order trigger date, the distribution center delivery date, and the store receipt date are calculated using a scheduling module.

3. The one or more computer-readable storage media for procurement monitoring of claim 2, wherein the scheduling module is configured to calculate the purchase order trigger date, the distribution center delivery date, and the store receipt date based on the purchase order generation date.

4. The one or more computer-readable storage media for procurement monitoring of claim 1, further comprising calculating a store presentation date.

5. The one or more computer-readable storage media for procurement monitoring of claim 1, further comprising the step of performing a task in response to a triggered activity.

6. The one or more computer-readable storage media for procurement monitoring of claim 5, wherein the task is at least one of a reminder, a date shift, a cancellation, and a correspondence.

7. The one or more computer-readable storage media for procurement monitoring of claim 1, further comprising calculating a distribution center issue date.

8. A computerized event management system for monitoring and managing procurement dates within a business enterprise, comprising:
  a purchase order module comprising a purchase order processing device, the purchase order module configured to generate a purchase order via one or more processors, the purchase order comprising a purchase order generation date and a product delivery date, the purchase order module configured to transfer the purchase order generation date and the product delivery date to the computerized event management system;
  the computerized event management system configured to generate a purchase order trigger date, a distribution center delivery date, and a store receipt date via one or more processors based on the product delivery date, the computerized event management system further configured to generate a first set of dates based on the product delivery date and a second set of dates based on the product delivery date, the first set of dates comprising a material staging date, an issue date, an arrival date, a handover date, and a distribution center storage date, the second set of dates comprising an order confirmation date, a quotation sample date, a sample photo date, a sample size date, a sample date, and a labeling date; and
  a scheduling module comprising a scheduling processing device, the scheduling module configured to generate a schedule bar based on at least the purchase order trigger date, the distribution center delivery date, and the store receipt date via one or more processors, the scheduling module configured to transfer the scheduling bar to the computerized event management system via one or more processors;
  the computerized event management system is configured to trigger an activity based on at least one of the purchase order trigger date, the distribution center delivery date, and the store receipt date exceeding an actual date via one or more processors;
  wherein the second set of dates exceeding the actual date has no effect on the first set of dates;
  the computerized event management system is configured to assign an identification number to each respective purchase order;
  the computerized management system is configured to store the activity in a business warehouse;
  the scheduling module is configured to merge dates generated at the item level prior to purchase order generation with the purchase order dates when the individual purchase order items correspond and create a data record in the schedule bar for individual purchase order items which do not correspond;
  the scheduling module is configured to provide a schedule bar for each respective purchase order generated;
  wherein a calculation of the purchase order generation date, the product delivery date, the purchase order trigger date, the distribution center delivery date, and the store receipt date are based on data from a vendor calendar, a logistics calendar, a distribution center logistics calendar, a store logistics calendar, an order cycle of an ordering retail site, and a delivery cycle of a recipient retail site; and
  wherein the vendor calendar includes information regarding a work schedule of a vendor of a product to which the purchase order is related, the logistics calendar includes information regarding transportation routings, the distribution center logistics calendar includes information regarding a schedule of a distribution center to which the product is to be delivered, the store logistics calendar includes information regarding a schedule of a store in which the product is to be sold, and the delivery cycle indicates days on which the product is delivered to the recipient retail site.

9. The computerized event management system of claim 8, wherein the scheduling module is configured to utilize a main transportation time, a lead transportation time, and a post transportation time.

10. The computerized event management system of claim 8, further comprising a transportation module configured to calculate a transportation time, a lead transportation time, and a post transportation time of the transportation chain.

11. The computerized event management system of claim 8, further comprising a calendar module configured to be utilized by the scheduling module.

12. The computerized event management system of claim 8, further comprising a forecasting module configured to calculate an impact of a first date change on the other dates.

13. A program product for monitoring and managing procurement dates within a business enterprise, the program product comprising at least one machine-readable medium having program code stored thereon for causing, when executed, one or more machines to perform the following method steps:
  generating, by a purchase order program module via one or more processors, at least one purchase order, the purchase order comprising a purchase order generation date and a product delivery date;
  transferring the purchase order generation date and the product delivery date to the event management system;
  calculating, by a calculation program module via one or more processors, a purchase order trigger date, a distribution center delivery date, and a store receipt date based on the product delivery date, the calculation program module configured to calculate dates based on product data;
  calculating, by the calculation program module via one or more processors, a first set of dates based on the product delivery date and a second set of dates based on the product delivery date, the first set of dates comprising a material staging date, an issue date, an arrival date, a handover date, and a distribution center storage date, the second set of dates comprising an order confirmation date, a quotation sample date, a sample photo date, a sample size date, a sample date, and a labeling date;

generating, by a scheduling program module, a schedule bar based the purchase order trigger date, the distribution center delivery date, and the store receipt date via one or more processors;

providing by the schedule program module via one or more processors, the schedule bar in the event management system, the schedule bar comprising the purchase order trigger date, the distribution center delivery date, the product delivery date, and the store receipt date;

triggering, by a procurement program module via one or more processors, an activity based on at least one of the distribution center delivery date, the product delivery date, and the store receipt date exceeding an actual date;

wherein the second set of dates exceeding the actual date has no effect on the first set of dates;

assigning an identification number to each respective purchase order;

storing the identification number in a business warehouse;

merging dates generated at the item level prior to purchase order generation with the purchase order dates when the individual purchase order items correspond and creating a data record in the schedule bar for individual purchase order items which do not correspond; and providing a schedule bar for each respective purchase order generated;

wherein the calculation of the purchase order generation date, the product delivery date, the purchase order trigger date, the distribution center delivery date, and the store receipt date are based on data from a vendor calendar, a logistics calendar, a distribution center logistics calendar, a store logistics calendar, an order cycle of an ordering retail site, and a delivery cycle of a recipient retail site;

wherein the vendor calendar includes information regarding a work schedule of a vendor of a product to which the purchase order is related, the logistics calendar includes information regarding transportation routings, the distribution center logistics calendar includes information regarding a schedule of a distribution center to which the product is to be delivered, the store logistics calendar includes information regarding a schedule of a store in which the product is to be sold, and the delivery cycle indicates days on which the product is delivered to the recipient retail site.

14. The program product for monitoring and managing procurement dates of claim 13, further comprising changing a date.

15. The program product for monitoring and managing procurement dates of claim 13, further comprising the step of setting a reminder for at least one date.

* * * * *